United States Patent
Tanaka

(10) Patent No.: US 6,224,021 B1
(45) Date of Patent: May 1, 2001

(54) THRUST CONTROL APPARATUS AND METHOD FOR AN AIRPLANE

(75) Inventor: Shigetaka Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/238,280

(22) Filed: Jan. 27, 1999

(30) Foreign Application Priority Data

Mar. 10, 1998 (JP) .................................................. 10-058305

(51) Int. Cl.⁷ ............................ B64D 31/00; B64C 19/00
(52) U.S. Cl. .......................................... 244/221; 244/76 R
(58) Field of Search ................................. 244/76 R, 180, 244/221, 234

(56) References Cited

U.S. PATENT DOCUMENTS

| | | | |
|---|---|---|---|
| 2,244,139 | * 6/1941 | Buckingham | 244/76 R |
| 2,740,255 | * 4/1956 | Machlanski | 244/76 R |

FOREIGN PATENT DOCUMENTS

| | | |
|---|---|---|
| 60-76499 | 4/1985 | (JP) . |
| 3-204393 | 5/1991 | (JP) . |
| 4-15196 | 1/1992 | (JP) . |
| 4-24197 | 1/1992 | (JP) . |
| 4-24198 | 1/1992 | (JP) . |
| 4-24199 | 1/1992 | (JP) . |
| 4-24200 | 1/1992 | (JP) . |
| 4-8697 | 1/1992 | (JP) . |
| 5-16890 | 1/1993 | (JP) . |
| 5-24585 | 2/1993 | (JP) . |
| 5-32199 | 2/1993 | (JP) . |
| 8-324496 | 10/1996 | (JP) . |

* cited by examiner

Primary Examiner—Robert P. Swiatek
(74) Attorney, Agent, or Firm—Kenyon & Kenyon

(57) ABSTRACT

In an airplane thrust control apparatus, a control unit (EEC) for controlling the throttle valve opening of an internal combustion engine installed in an airplane and the propeller revolution speed is provided in order to control the engine to appropriate conditions suitable to various flight conditions. During normal operation, the EEC sets the throttle valve opening and the propeller revolution speed in accordance to the stroke of a single power lever. However, if it is determined that the airplane is descending, the EEC sets the throttle valve opening to a value less than the normal set opening, and sets the propeller revolution speed to a high revolution speed equal to or higher than a predetermined revolution speed, regardless of the set revolution speed. Therefore, the thrust control apparatus is able to achieve a sufficient descending rate by reducing the engine output while maintaining high supercharger revolution speed high and maintaining required cabin pressurization.

13 Claims, 12 Drawing Sheets

1. INTERNAL COMBUSTION ENGINE
2. PROPELLER
10. SUPERCHARGER
11. THROTTLE VALVE
26. WASTE GATE VALVE
31. PROPELLER GOVERNOR

1. INTERNAL COMBUSTION ENGINE
2. PROPELLER
10. SUPERCHARGER
11. THROTTLE VALVE
26. WASTE GATE VALVE
31. PROPELLER GOVERNOR

THRUST CONTROL APPARATUS AND METHOD FOR AN AIRPLANE

INCORPORATION BY REFERENCE

The disclosure of Japanese Patent Application No. HEI 10-58305 filed on Mar. 10, 1998 including the specification, drawings and abstract is incorporated herein by reference in its entirety.

BACKGROUND OF THE INVENTION

1. Field of the Invention

The present invention relates to a thrust control apparatus and a thrust control method for an airplane.

2. Description of the Related Art

A typical airplane engine having a variable pitch propeller employs a propeller governor that adjusts the propeller-consumed drive force by varying a pitch of the propeller and thereby controls the engine revolution speed to a set revolution speed. The engine output is controlled separately from the revolution speed by adjusting the opening of a throttle valve disposed in an engine intake passage. Therefore, an operator must simultaneously adjust the set revolution speed of the propeller governor and the set opening of the throttle valve in order to obtain a desired propeller thrust.

Japanese Patent Application Laid-Open No. HEI 8-324496 discloses an aircraft thrust control apparatus for varying both the set revolution speed of the propeller governor and the set opening of the throttle valve in an aircraft engine having a variable pitch propeller, through operation of a single lever. Since the disclosed apparatus controls the set revolution speed of the propeller governor and the opening of the throttle valve separately and simultaneously through operation of a single lever, the apparatus reduces the workload on the operator. Moreover, this apparatus varies at least one of the set revolution speed of the propeller governor and the opening of the throttle valve non-linearly in relation to the amount of operation of the single lever to facilitate conforming in advance the setting of the maneuvering characteristic to the body or airframe characteristics.

This related-art thrust control apparatus makes it possible to facilitate reduction of the workload on a pilot and conformation to the body characteristics through settings made beforehand such that the set revolution speed of the propeller governor and the opening of the throttle valve have a predetermined relationship to the amount of operation of the single lever. However, in this thrust control apparatus, since the governor set revolution speed and the throttle opening are simultaneously determined in accordance with the amount of operation of the single lever, a problem may be caused by the fixed relationship between the governor set revolution speed and the throttle opening.

More specifically, if the relationship between the governor set revolution speed and the throttle opening is fixed, the relationship between the engine revolution speed and the output torque also becomes fixed, so that an optimal engine revolution speed and an optimal output torque may not be obtained in various flight conditions. For example, at high altitudes, the pressure ejected from the engine supercharger (boost pressure) in an aircraft needs to be kept at least at a predetermined level because air ejected from the supercharger is used to pressurize the cabin. However, if the engine revolution speed decreases, the corresponding reduction in the exhaust gas flow may decrease the ejection pressure of the supercharger so that sufficient cabin pressurization may not be maintained. Therefore, a drastic reduction in the engine revolution speed at high altitudes is not desirable. In addition, under a condition that a constant throttle opening is maintained, the engine output increases as the boost pressure increases. Consequently, for example, during a descent from a high altitude where the governor set revolution speed is set relatively high in order to maintain a required supercharger ejection pressure level and, therefore, the throttle opening also becomes set to a relatively great value due to the fixed relationship between the governor set revolution speed and the throttle opening, it may become difficult or impossible to sufficiently reduce the engine output to a desired level. Thus, a fixed relationship between the governor set revolution speed and the throttle opening may cause a problem that during a descent, the propeller thrust becomes excessively great so that a sufficient descent (descending rate) of the aircraft body cannot be achieved.

Furthermore, when the boost pressure has reached an intercept point (the set maximum boost pressure) during a steady flight condition, the full load operation of the engine is normally feasible, so that it is preferable to fully open the throttle valve regardless of the engine revolution speed and thereby reduce the intake resistance. However, if the relationship between the engine revolution speed and the throttle opening is fixed, it may become impossible to fully open the throttle opening, depending on the revolution speed. Consequently, the fuel economy improvement achieved by a reduction in the intake resistance may become insufficient.

Further, if a failure occurs in a waste gate valve that controls the revolution speed of the supercharger by adjusting the exhaust gas flow into the supercharger, the boost pressure will excessively increase so that the engine output will become excessively great. In such a case, a fixed relationship between the engine revolution speed and the throttle opening makes it impossible to limit the boost pressure by adjusting the throttle opening while maintaining a constant engine revolution speed.

Moreover, a fixed relationship between the propeller revolution speed (engine revolution speed) and the throttle valve opening may make it impossible to operate the propeller or the engine at favorable efficiency points in various flight conditions.

The aforementioned problems can be reduced or solved to some extent by a conventional design that allows an operator to adjust the governor set revolution speed and the throttle opening separately. However, this conventional design cannot reduce the workload on the pilot.

SUMMARY OF THE INVENTION

Accordingly, it is an object of the present invention to provide a thrust control apparatus and a thrust control method for an airplane that are able to appropriately control the engine operating condition in accordance with various flight conditions while reducing the workload on an operator.

An aspect of the invention provides an airplane thrust control apparatus including an internal combustion engine installed in an airplane, a variable pitch propeller connected to an output shaft of the engine, a variable pitch device for controlling a revolution speed of the engine to a set revolution speed by changing a pitch of the propeller, a throttle device for controlling a throttle valve opening of the engine to a set opening, a lever for controlling the variable pitch device and the throttle device, a first control device for setting the set revolution speed of the variable pitch device and the set opening of the throttle device in accordance with an amount of operation of the lever, a flight parameter detection device for detecting a flight condition parameter that indicates a flight condition of the airplane, and a second control device for correcting the set revolution speed of the variable pitch device set by the first control device and the set opening of the throttle device set by the first control device, on the basis of the flight condition parameter.

In this airplane thrust control apparatus, the set revolution speed of the variable pitch device and the set opening of the throttle device are set by the first control device in accordance with the amount of operation of the lever, on the basis of a predetermined relationship. Therefore, the complicated operation performed by the operator to separately set the revolution speed and the throttle valve opening is eliminated. Fixed relationship between the engine revolution speed and the throttle valve opening set by the first control device may cause an event where the combination of the engine revolution speed and the throttle valve opening is not optimal to a given flight condition. However, in this invention, the second control device corrects the revolution speed and the throttle valve opening set by the first control device, in accordance with the flight condition, so that the revolution speed and the throttle valve opening are set to appropriate values suitable to flight conditions.

Another aspect of the invention provides an airplane thrust control apparatus including a plurality of propelling apparatuses each having an engine, a variable pitch propeller, a variable pitch device, a throttle valve, and a throttle device and a first control device. A flight parameter detection device detects a revolution phase of a blade of the propeller of each propelling apparatus. A second control device corrects the set revolution speed of the variable pitch devices set by the first control devices, so as to synchronize the blades of the propellers in revolution phase.

In this airplane thrust control apparatus, a plurality of engines and a plurality of propellers are provided. The second control device controls the set revolution speed of each variable pitch device so as to synchronize the revolution phases of the propeller blades of the propelling apparatuses. In an airplane having a plurality of propellers, for example, a twin-engined aircraft, non-synchronous propeller revolution phases may increase the noise level due to interference between eddies that occur along the propeller slipstreams. In this invention, since the second control device finely adjusts the engine revolution speed so that the revolution phases of the propellers become synchronized, the noise level can be reduced.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
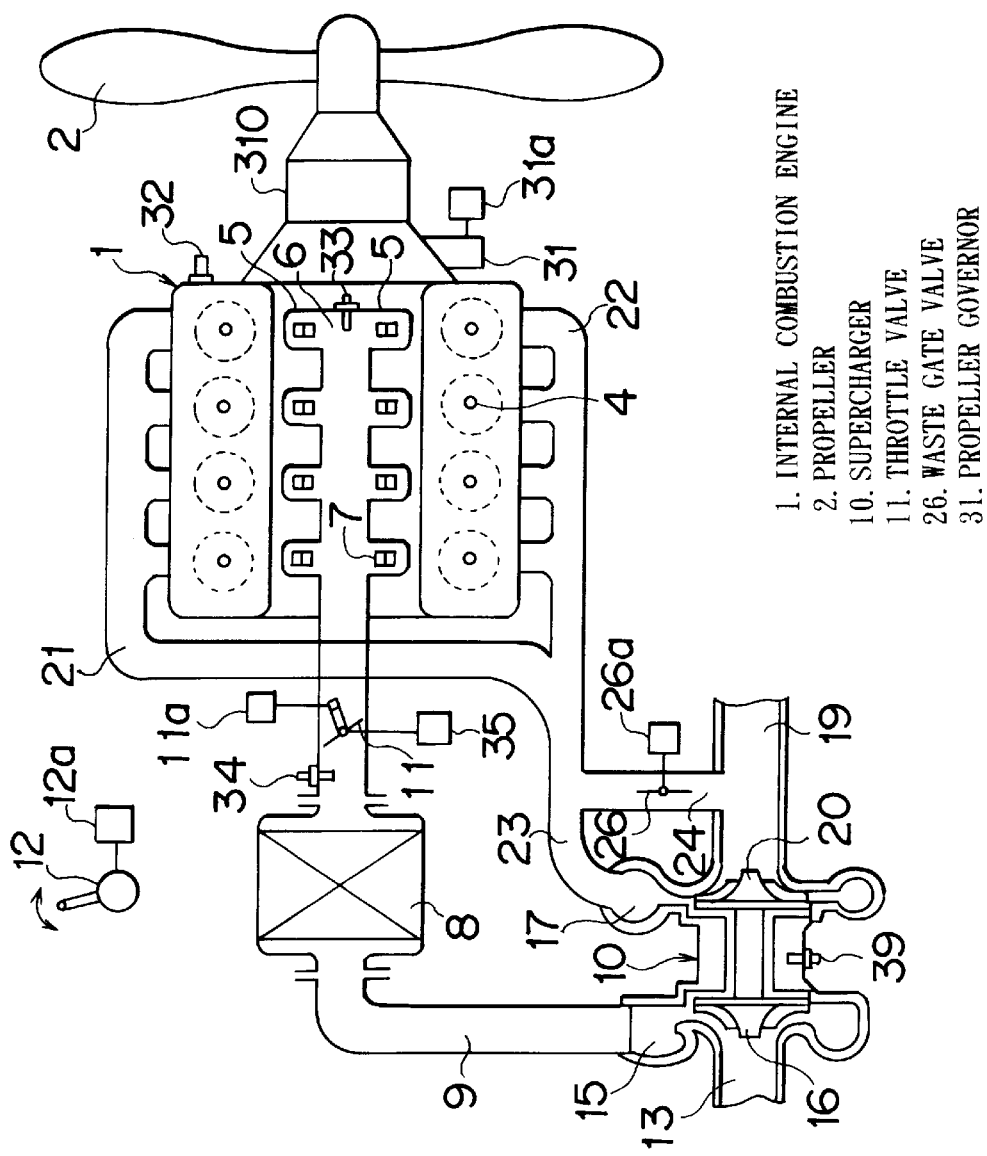
FIG. 1 is a schematic illustration of the construction of an embodiment of the thrust control apparatus of the invention.

FIG. 1 is a schematic illustration of the construction of a first embodiment of the invention. As indicated in FIG. 1, a propeller 2 is driven by an internal combustion engine 1. In this embodiment, the engine 1 is a multi-cylinder (V-type 8-cylinder) four-stroke reciprocating engine. An intake manifold 5 is connected to an intake port of each cylinder of the engine 1 by a common intake duct 6. Fuel injection valves 7 are disposed near the connecting portions of the intake manifold 5 to the intake ports of the cylinders. Each fuel injection valve 7 injects pressurized fuel into the intake of port of a corresponding cylinder of the engine 1.

As shown in FIG. 1, a throttle valve 11 is disposed in the intake duct 6. The throttle valve 11 has an actuator 11a, whereby the throttle valve 11 provides a valve opening in accordance with a control signal from an engine electric control unit (EEC) 30 described below. An intercooler 8 is disposed upstream in the intake duct 6 from the throttle valve 11. The intercooler 8 is connected to an ejection opening 15 of a compressor 16 of an exhaust turbocharger (supercharger) 10 by an intake duct 9.

Exhaust ports of the cylinders on both banks of the V-type engine 1 are connected to a common exhaust pipe 23 by exhaust manifolds 21, 22. The common exhaust pipe 23 is connected to an exhaust inlet 17 of an exhaust turbine 20 of the turbocharger 10.

The turbocharger 10 is made up mainly of the centrifugal compressor 16 and the exhaust turbine 20 for driving the compressor 16. Intake air for the engine 1 flows from an air cleaner (not shown) through an intake inlet pipe 13 into the compressor 16, whereby air pressure is increased. Supercharged air from the compressor 16 flows through the intake duct 9 into the intercooler 8. After being cooled by the intercooler 8, supercharged air is supplied into each cylinder of the engine 1, via the intake duct 6, the throttle valve 11 and the intake manifold 5. Although not indicated in FIG. 1, a portion of the amount of air ejected from the turbocharger 10 is extracted upstream of the throttle valve 11, and used to pressurize the cabin of the airplane.

Exhaust gas from the engine 1 flows through the exhaust manifolds 21, 22, the exhaust pipe 23 and the exhaust inlet 17 into the exhaust turbine 20. After revolving the exhaust turbine 20 and the compressor 16 connected thereto, exhaust gas is discharged from an exhaust outlet pipe 19.

In this embodiment, an exhaust bypass 24 is connected between the exhaust pipe 23 and the exhaust outlet pipe 19 of the turbine 20. The exhaust bypass 24 is provided with a waste gate valve (hereinafter, referred to as "WGV") 26 that controls the flow of exhaust gas flowing into the exhaust outlet pipe 19 through the exhaust bypass 24 bypassing the exhaust turbine 20. When the WGV 26 is in a completely closed state, the entire amount of exhaust gas from the engine 1 flows into the exhaust turbine 20, so that the revolution speed of the turbocharger 10 increases and therefore the outlet pressure of the compressor 16 (boost pressure) increases. When the WGV 26 is open, a portion of exhaust gas from the engine 1 bypasses the exhaust turbine 20 and flows out into the exhaust outlet pipe 19, so that the flow of exhaust gas passing through the exhaust turbine 20 decreases and, therefore, the revolution speed of the turbocharger 10 decreases. In this manner, the boost pressure decreases in accordance with the opening of the WGV 26. That is, by adjusting the opening of the WGV 26, the boost pressure to the engine 1 can be reduced to a desired level. The WGV 26 is provided with an actuator 26a that operates in accordance with a control signal from the engine electric control unit (EEC) 30 indicated in FIG. 2. Thereby, the WGV 26 is operated to an opening in accordance with the control signal from the EEC 30.

In this embodiment, the propeller 2 driven by the engine 1 is a variable-pitch propeller equipped with a propeller governor 31, that is, a variable pitch device, for variably controlling the propeller pitch of the propeller 2. In this embodiment, the propeller governor 31 is connected to a variable-pitch mechanism 310 of the propeller 2 by a transmission shaft (not shown). The EEC 30 operates to adjust the propeller pitch by controlling the propeller governor 31 so that the engine revolution speed (propeller revolution speed) becomes equal to a set revolution speed. That is, if the propeller revolution speed becomes higher than the set revolution speed, the EEC 30 controls the propeller governor 31 so as to increase the propeller pitch. Therefore, the propeller-absorbed power is increased, so that the engine revolution speed is reduced. If the propeller revolution speed becomes lower than the set revolution speed, the EEC 30 controls the propeller governor 31 so as to reduce the propeller pitch. Therefore, the propeller-absorbed power is reduced, so that the engine revolution speed is increased. In this manner, the propeller revolution speed (engine revolution speed) is controlled so as to become equal to the set revolution speed. In this embodiment, the propeller governor 31 is provided with an actuator 31a that operates in accordance with a control signal from the EEC 30. The actuator 31a controls the propeller governor 31 to change the propeller pitch in accordance with the control signal from the EEC 30. In stead of using the type of propeller governor 31, an other type of governor may also be used, for example, a known centrifugal governor capable of setting a suitable revolution speed by using an actuator controlled by the EEC 30.

The variable-pitch mechanism 310 is a known mechanism for setting a desired propeller pitch, and will not be described in detail.

In this embodiment, the actuators 11a, 26a, 31a for the throttle valve 11, the WGV 26 and the propeller governor 31 are formed of DC motors that operate in accordance with the control signals from the EEC 30 (FIG. 2) to adjust the opening of the throttle valve 11, the set revolution speed of the propeller governor 31, and the opening of the WGV 26, respectively. For the actuators 11a, 26a, 31a, actuators other than DC motors may also be used as long as they are controllable in accordance with the control signals from the EEC 30. For example, electric or hydraulic actuators may be used.

A power lever 12 is provided for setting the set revolution speed of the propeller governor 31 and the opening of the throttle valve 11. The power lever 12 is provided with a stroke sensor 12a that generates a signal in accordance with the amount of operation of the power lever 12.

Figure 2:
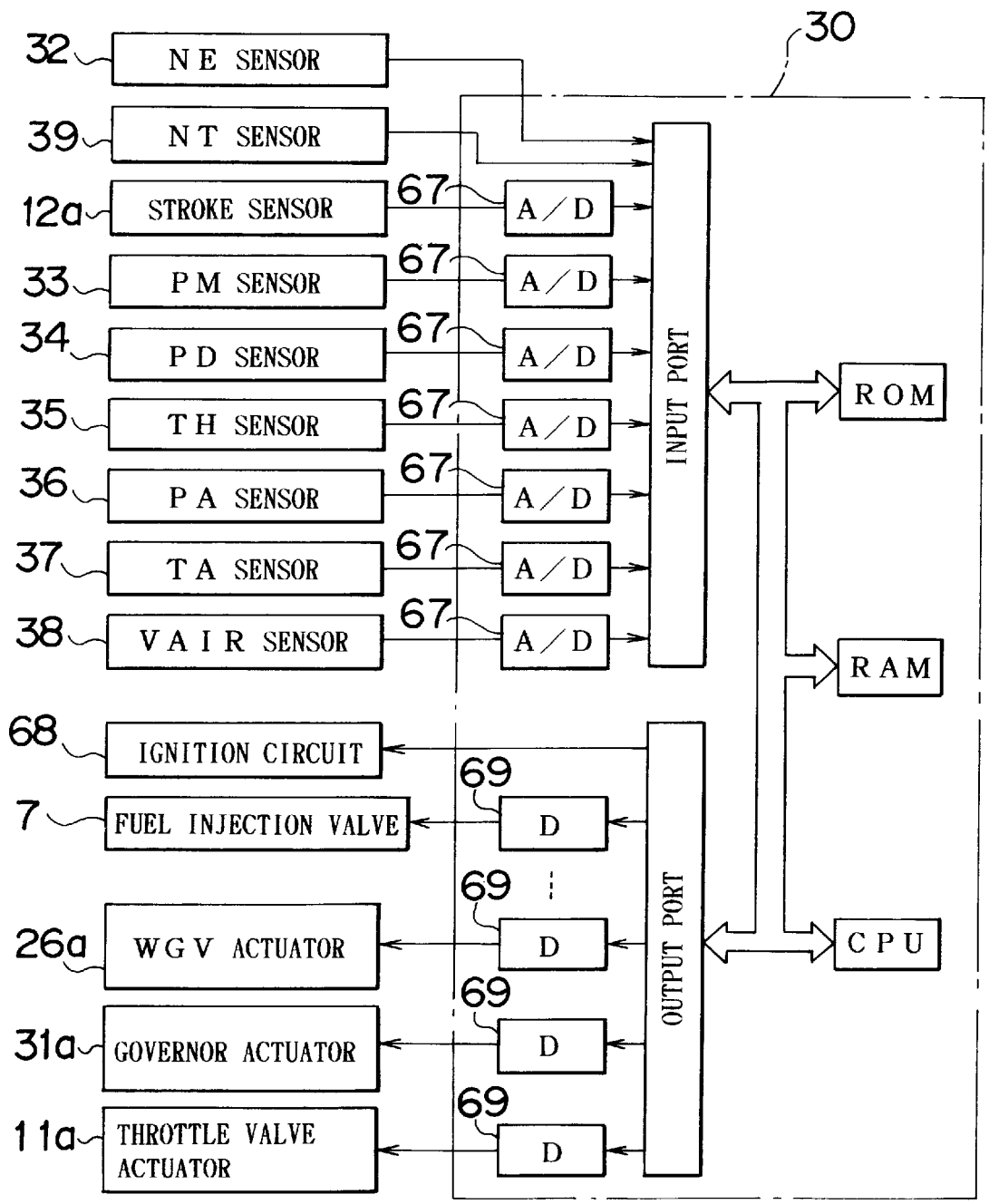
FIG. 2 illustrates an example of the construction of a control unit shown in FIG. 1.

FIG. 2 illustrates the construction of the EEC 30 for controlling the engine 1. In this embodiment, the EEC 30 is provided as a microcomputer in which a RAM, a ROM, a CPU, an input port and an output port are interconnected by a bi-directional bus as in a known microcomputer construction. The EEC 30 performs basic control operations of the engine 1, such as fuel injection control, ignition timing control and the like. Furthermore, in this embodiment, the EEC 30 functions as a first control device for controlling the actuators 31a, 11a in accordance with the amount of operation of the power lever 12 so as to set the set revolution speed of the propeller governor 31 and the opening of the throttle valve 11 to values determined by the amount of operation of the power lever 12 as described below. The EEC 30 also functions as a second control device for correcting the set revolution speed of the propeller governor 31 and the opening of the throttle valve 11 set in accordance with the amount of operation of the power lever 12, in accordance with the flight conditions of the airplane.

For the aforementioned control operations, a pulse signal in accordance with the revolution speed NE of the engine 1 is inputted to the input port of the EEC 30 from an engine speed sensor 32 as shown in FIG. 2. The engine speed sensor 32 is provided at the crankshaft (not shown) of the engine 1. The CPU of the EEC 30 calculates an engine revolution speed NE based on the pulse signal from the engine speed sensor 32 at constant time intervals, and uses the calculated values for the various controls described below. Similarly, a pulse signal in accordance with the revolution speed NT of the turbocharger 10 is inputted into the input port of the EEC 30 from a turbocharger speed sensor 39 provided at the rotating shaft of the turbocharger 10. Based on the pulse signal from the turbocharger speed sensor 39, the CPU calculates a revolution speed NT of the turbocharger 10 at constant time intervals. The engine speed sensor 32 is actually made up of two sensors: a crankshaft rotational angle sensor that outputs a rotational pulse signal for every predetermined crankshaft rotational angle (for example, every 15°) and a revolution phase sensor that outputs a reference pulse signal every time the crankshaft reaches a reference rotational position (for example, the compression top dead center of the first cylinder of the engine 1). Therefore, besides calculating an engine revolution speed, the EEC 30 calculates a crankshaft revolution phase from the number of rotational pulse signals that follow the input of a reference pulse signal at constant time intervals.

Other various signals are also inputted to the input port of the EEC 30. A voltage signal proportional to the absolute pressure PM in the intake duct 6 is inputted from a PM sensor 33 provided in the intake duct 6 downstream of the throttle valve 11, via an A/D converter 67. A voltage signal proportional to the boost pressure PD (absolute pressure) of the turbocharger 10 is inputted from a PD sensor 34 provided in the intake duct 6 upstream of the throttle valve 11, via another A/D converter 67. A voltage signal in accordance with the opening TH of the throttle valve 11 is inputted from a TH sensor 35, via an A/D converter 67. A voltage signal in accordance with the air temperature TA is inputted from a TA sensor 37, via an A/D converter 67. A voltage signal in accordance with the air pressure PA is inputted from a PA sensor 36, via an A/D converter 67. A signal corresponding to the airspeed during flight is inputted from a VAIR sensor 38 provided outside the airplane body, via an A/D converter 67. A signal in accordance with the amount of operation PST of the power lever 12 is inputted from the stroke sensor 12a of the power lever 12, via an A/D converter 67.

The output port of the EEC 30 is connected to an ignition plug 4 and the fuel injection valve 7 of each cylinder of the engine 1 by an ignition circuit 68 and a drive circuit 69, respectively, so that the ignition timing, the fuel injection amount and the fuel injection timing are controlled. In this embodiment, the EEC 30 sets an optimal fuel injection amount, an optimal fuel injection timing, and an optimal ignition timing on the basis of the intake pressure PM detected by the PM sensor 33 and the engine revolution speed NE detected by the engine speed sensor 32, with reference to numerical tables pre-stored in the ROM. Based on the thus-set optimal values, fuel injection and ignition are performed.

The output port of the EEC 30 is also connected to the actuators 11a, 31a, 26a of the throttle valve 11, the propeller governor 31 and the WGV 26, via respective drive circuits 69.

Figure 3:
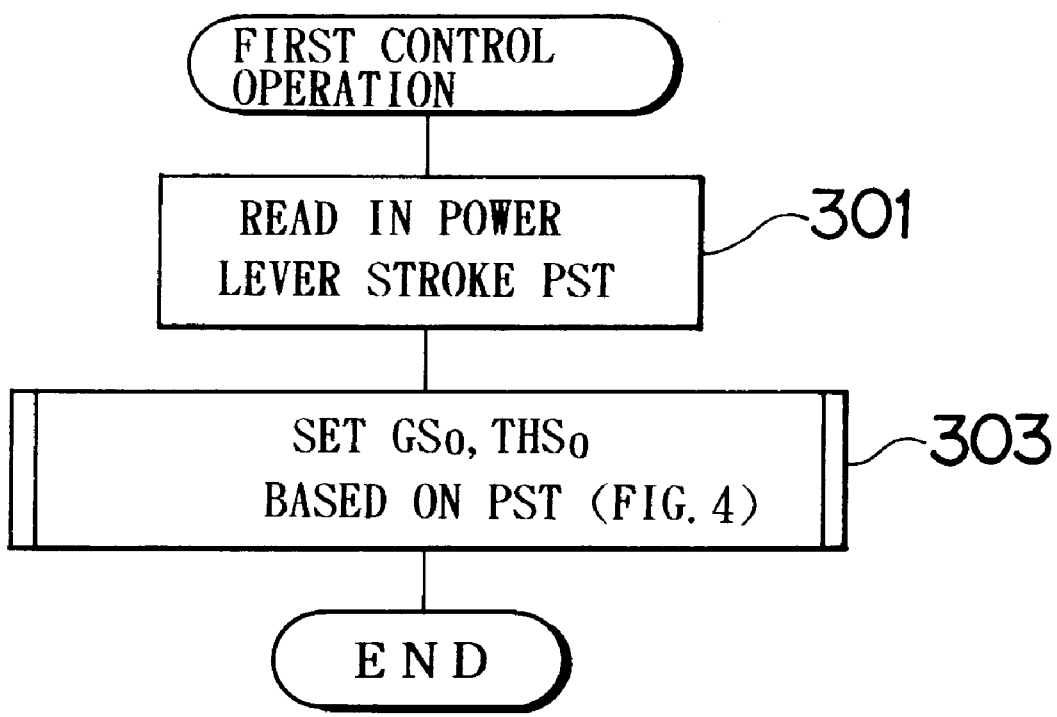
FIG. 3 is a flowchart illustrating a first control operation.

The set revolution speed of the propeller governor 31 and the set opening of the throttle valve 11 according to this embodiment will be described. In this embodiment, the EEC 30 determines a basic set revolution speed $GS_0$ and a basic set opening $THS_0$ in accordance with the stroke (amount of operation) of the power lever 12. FIG. 3 shows a flowchart illustrating a first control operation of setting the basic set revolution speed $GS_0$ and the basic set opening $THS_0$. The operation illustrated in FIG. 3 is performed by a routine executed by the EEC 30 at constant time intervals.

When the operation illustrated in FIG. 3 is started, the EEC 30 reads in the stroke PST of the power lever 12 from the stroke sensor 12a in step 301. Subsequently in step 303, the EEC 30 sets basic set values $GS_0$, $THS_0$ from the power lever stroke PST on the basis of a predetermined relationship.

Figure 4:
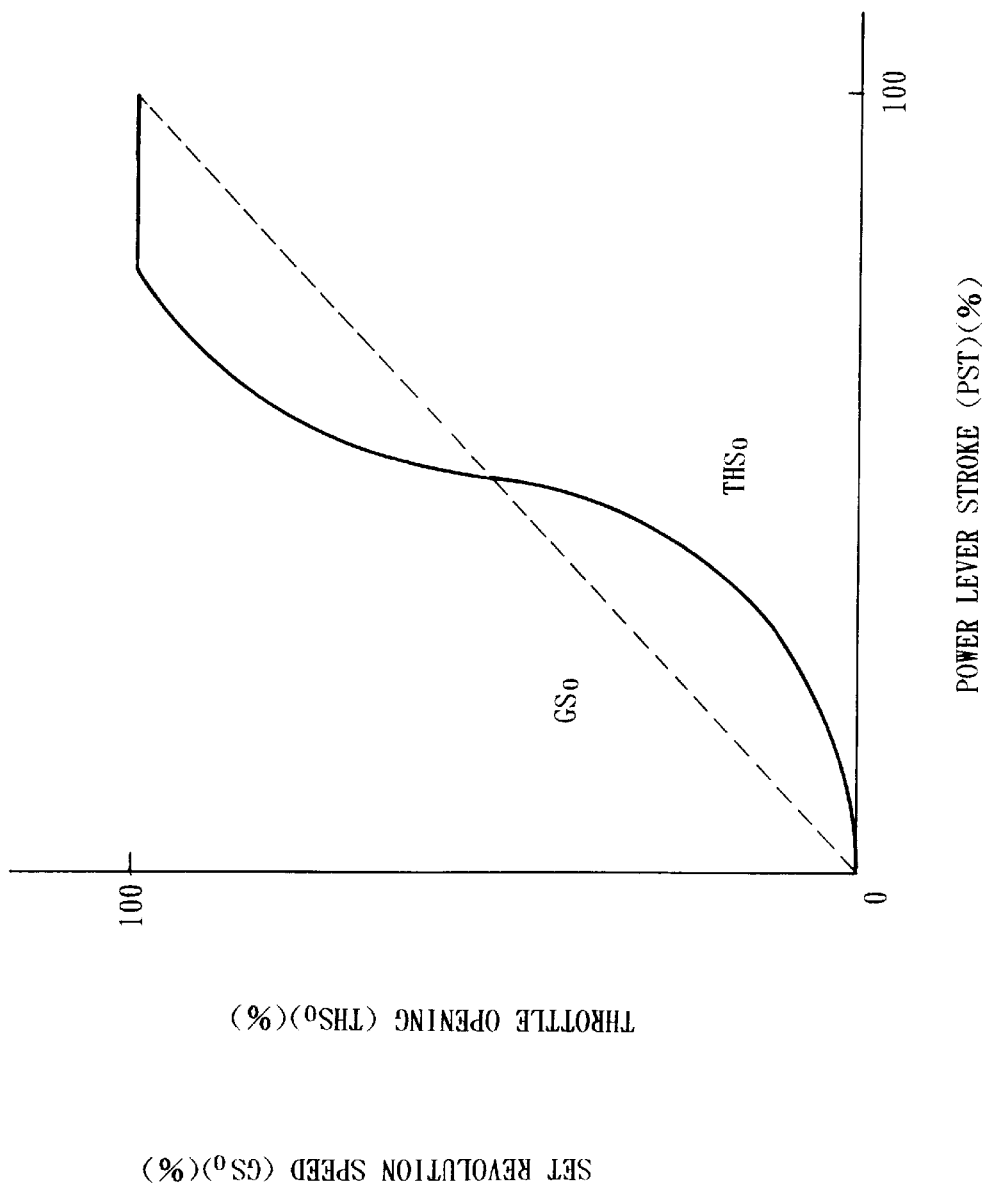
FIG. 4 is a chart used for the control operation illustrated in FIG. 3.

FIG. 4 is a chart used to set the basic values $GS_0$, $THS_0$ in step 303. The chart of FIG. 4 indicates an example of the relationship between the power lever stroke PST and the basic set values $GS_0$, $THS_0$. As indicated in the chart, the basic set revolution speed $GS_0$ of the propeller governor 31 and the basic set opening $THS_0$ of the throttle valve 11 are set to values determined corresponding to the stroke PST of the power lever 12 in this embodiment. Whereas the basic set revolution speed $GS_0$ of the propeller governor 31 is proportional to the stroke PST of the power lever 12, the basic set opening $THS_0$ of the throttle valve 11 varies non-linearly to the power lever stroke PST. The relationship of the basic set values $GS_0$, $THS_0$ to the power lever stroke PST can be substantially freely pre-set in accordance with the airplane body characteristics. In normal flight conditions, the set revolution speed of the propeller governor 31 and the opening of the throttle valve 11 are set to their respective basic set values $GS_0$, $THS_0$. However, once the relationship is set as indicated in FIG. 4, each of the basic set values $GS_0$, $THS_0$ is set to a single value corresponding to a given stroke of the power lever 12. Thus, the relationship between the basic set revolution speed $GS_0$ (engine and propeller revolution speed) and the basic set opening $THS_0$ (engine output) becomes fixed.

Therefore, if the set revolution speed of the propeller governor 31 and the opening of the throttle valve 11 are always set to the basic set values $GS_0$, $THS_0$, the relationship between the set governor revolution speed and the throttle valve opening may become inappropriate in a certain flight condition. In such a flight condition, this embodiment corrects the basic set values $GS_0$, $THS_0$ set through the operation illustrated in FIG. 3, in accordance with the flight condition, and uses the corrected set governor revolution speed and the corrected throttle valve opening value to control the propeller governor 31 and the throttle valve 11.

In various embodiments of the invention, the first control operation illustrated in FIG. 3 is commonly performed. However, the embodiments described hereinafter differ from one another in the correction operation described below, that is, a second control operation or device. The second control operation or device according to each embodiment will be described below.

The operation of correcting the basic set revolution speed $GS_0$ of the propeller governor 31 and the basic set opening $THS_0$ of the throttle valve 11, performed by the EEC 30 as a function of the second control device in the first embodiment, will be described.

In the second control operation in the first embodiment, the basic set values $GS_0$, $THS_0$ are corrected in order to achieve a sufficient descending rate while maintaining sufficient cabin pressurization during a descent of the airplane.

In the construction as shown in FIG. 1, a portion of supercharger-ejected air is used to pressurize the cabin, so that high supercharger revolution speed needs to be maintained to prevent a significant reduction in the supercharger ejection pressure during a descent from a high altitude or the like. In order to maintain high supercharger revolution speed, it is necessary to maintain great engine exhaust flow. Therefore, the engine revolution speed must not be reduced below a certain level.

In the first control operation, however, the relationship between the engine revolution speed (the set governor revolution speed) and the engine output (the throttle valve opening) is fixed, so that an increased setting of the engine revolution speed increases the throttle valve opening and therefore makes it impossible to sufficiently reduce the engine output. Consequently, a problem may occur that during a descent, the propeller thrust cannot be sufficiently reduced, and an insufficient descending rate results from an excessive propeller thrust. Therefore, in the second control operation according to the first embodiment, the governor set revolution speed is kept at least at predetermined revolution speed (that is, an engine revolution speed that provides a turbocharger revolution speed sufficiently high for the required cabin pressurization) during descent of the airplane body. At the same time, in order to reduce the increase in the engine output caused by an increase in the boost pressure, the throttle valve opening is corrected so as to become less than the basic set opening $THS_0$.

Figure 5:
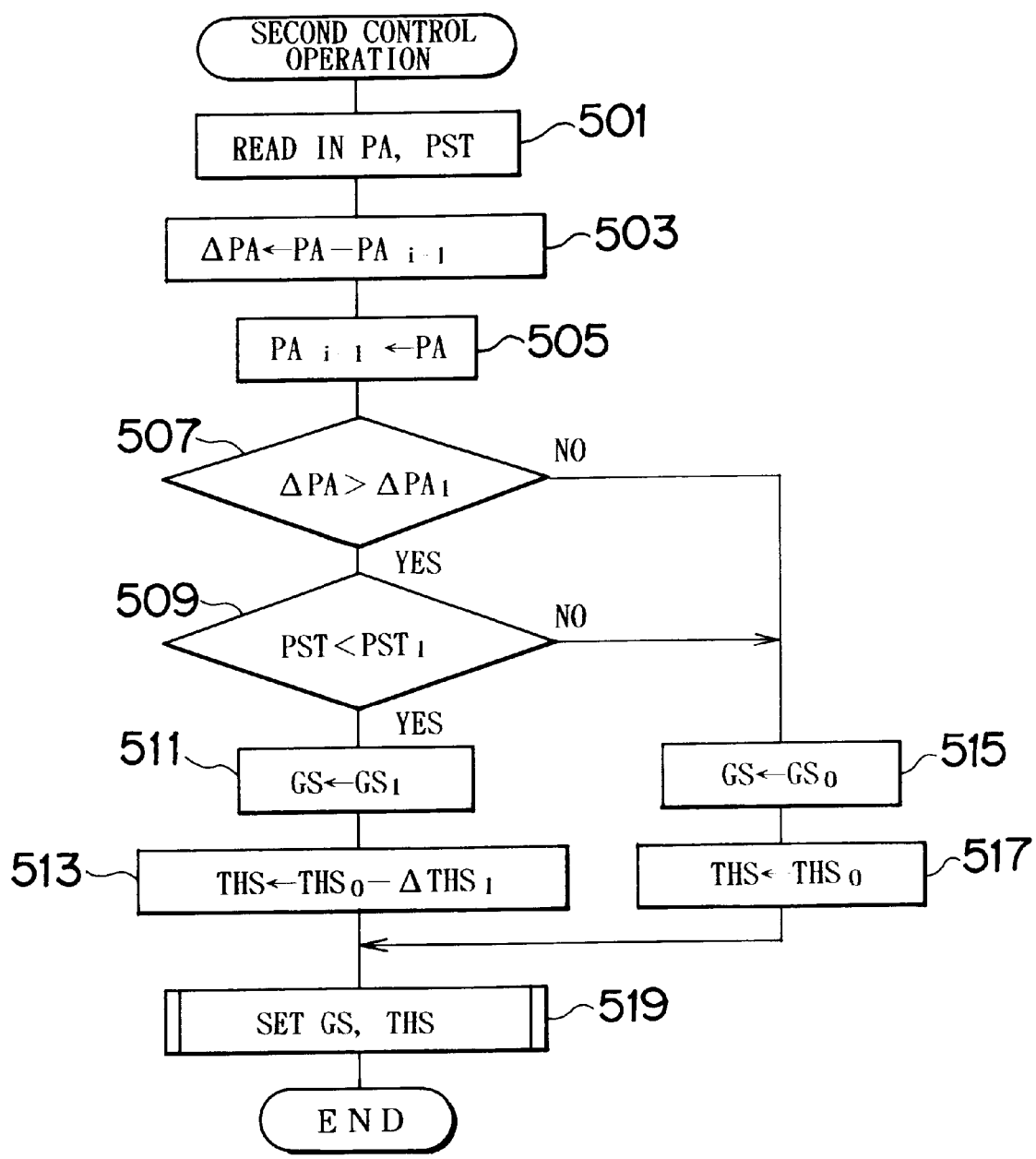
FIG. 5 is a flowchart illustrating a second control operation according to a first embodiment of the invention.

FIG. 5 is a flowchart illustrating the second control operation. This operation is performed by a routine executed by the EEC 30 at constant time intervals.

In step 501, the EEC 30 reads in the air pressure PA from the PA sensor 36 and the power lever stroke PST from the stroke sensor 12a. Subsequently in step 503, the change in air pressure from the air pressure value detected in the previous execution of the operation is calculated as $\Delta PA = PA - PA_{i-1}$ where $PA_{i-1}$ is the air pressure detected in the previous execution of the routine. The value $PA_{i-1}$ is updated in step 505 in every execution of the routine to prepare for the next execution thereof.

In steps 507 and 509, it is determined whether an operation for descent is being performed. If the air pressure change (increase) $\Delta PA$ calculated in step 503 is greater than a predetermined value $\Delta PA_1$ ("YES" in step 507), and if the power lever stroke PST is less than predetermined value $PST_1$ ("YES" in step 509), it is determined that the descending operation is being performed. That is, if the altitude change (decrease) is greater than a predetermined amount, and if the stroke of the power lever 12 is set to a relatively small value by the pilot, it is determined that the airplane body is descending based on an operation performed by the pilot.

If it is determined in steps 507 and 509 that an operation for descent is being performed, operation proceeds to step 511, in which the set revolution speed GS of the propeller governor 31 is set to a predetermined value $GS_1$ regardless of the basic set value $GS_0$ set in the first control operation. Subsequently in step 513, the set opening THS of the throttle valve 11 is set to a value that is smaller by a predetermined value $\Delta THS_1$ than the basic set value $THS_0$ set in the first control operation. The predetermined value $GS_1$ is preferably set to an appropriate value that is greater than the minimum engine revolution speed that can provide a turbocharger revolution speed sufficiently high to maintain required cabin pressurization. The predetermined value $\Delta THS_1$ is preferably set to a value that can sufficiently reduce the engine output increase caused by an increase in the boost pressure.

Conversely, if one of the conditions of steps 507 and 509 is not met, it is determined that the descending operation is not being performed. In this case, operation proceeds to step 515, in which the set revolution speed GS of the propeller governor 31 is set to the basic set value $GS_0$ set in the first control operation. Subsequently in step 517, the set opening THS of the throttle valve 11 is set to the basic set value $THS_0$ set in the first control operation.

After setting the set revolution speed GS and the set opening THS, the EEC 30 outputs the values GS, THS to the drive circuits 69 of the actuators 31a, 11a of the propeller governor 31 and the throttle valve 11, respectively. The present execution of the second control operation then ends. Through this control operation, the propeller governor 31 adjusts the propeller pitch so that the engine revolution speed (propeller revolution speed) becomes equal to the set value GS, and the throttle valve 11 provides the set opening THS.

As understood from the above description, the second control device corrects the engine revolution speed and the throttle opening so as to reduce the throttle opening while maintaining at least a predetermined engine revolution speed during descent of the airplane. Therefore, the maintenance of a high engine revolution speed prevents a significant reduction in the supercharger ejection pressure, and the reduction of the throttle valve opening results in a reduction in the propeller thrust. Consequently, the airplane body descending rate is increased while required cabin pressurization is maintained.

More specifically, this embodiment allows the engine output to be reduced while securing required cabin pressurization, when the descending operation is being performed. The descending rate can thus be increased. Moreover, the setting of the propeller governor 31 and the throttle valve opening can be performed simply by operating the power lever 12 as in the conventional art, this embodiment prevents an increase in the workload on the operator or pilot in the descending operation.

Although in the operation illustrated in FIG. 5, it is determined whether the operation for descent is being performed on the basis of the changing rate of air pressure (altitude) and the stroke of the power lever 12 (steps 507, 509), it is also possible to provide a descent switch operatable by a pilot and to determine whether the descent switch is operated, instead of (or in addition to) the determining operations in steps 507 and 509, prior to the operations of setting the basic set values $GS_0$, $THS_0$ in steps 511 and 513.

The second control operation according to the second embodiment of the invention will be described below.

In the second embodiment, if the airplane is in a steady flight condition and if the supercharger has reached the intercept point (that is, if the boost pressure PD has reached the maximum set pressure), the throttle valve opening THS is set to a full opening ($THS_{MAX}$) regardless of the basic set value $THS_0$ set in the first control operation.

In this embodiment, if the boost pressure PD reaches a predetermined maximum boost pressure $PD_{MAX}$, the EEC 30 opens the WGV 26 so as to maintain the maximum boost pressure $PD_{MAX}$. Therefore, when the supercharger has reached the intercept point, the boost pressure becomes constant regardless of the throttle valve opening. As a result, it is preferable that after the supercharger has reached the intercept point, the throttle valve be held fully open in order to reduce the intake resistance and therefore reduce the fuel consumption. In this embodiment, the opening of the throttle valve 11 is set to and kept at the maximum opening regardless of the set value set in the first control operation, when the airplane is in the steady flight condition after the supercharger has reached the intercept point.

Figure 6:
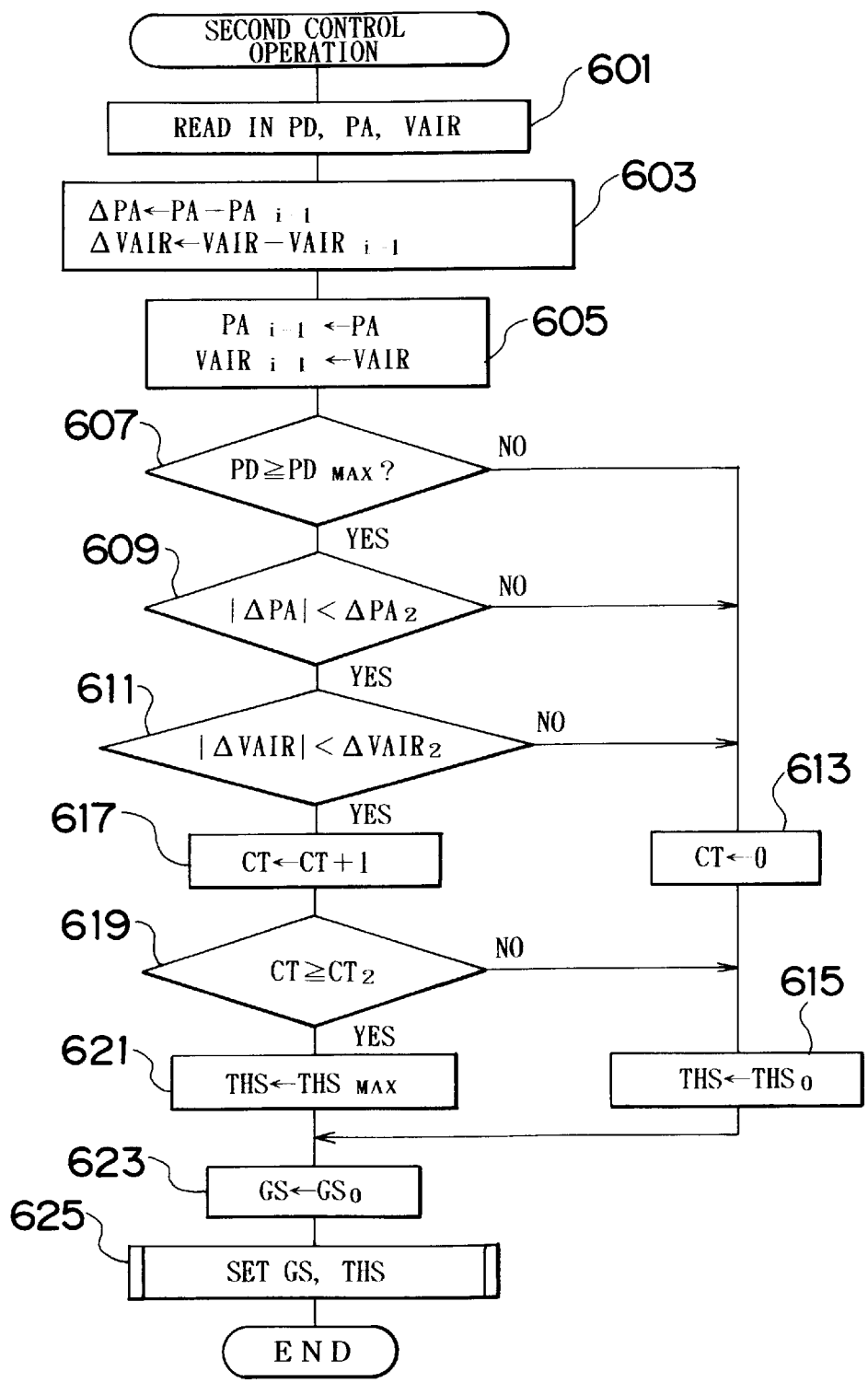
FIG. 6 is a flowchart illustrating the second control operation according to a second embodiment of the invention.

FIG. 6 shows a flowchart illustrating the second control operation according to this embodiment. This operation is performed by a routine executed by the EEC 30 at constant time intervals.

In the operation illustrated in FIG. 6, the EEC 30 reads in the boost pressure PD, the air pressure PA and the air speed VAIR from the sensors 34, 36, 38, respectively, in step 601. Subsequently in step 603, the EEC 30 calculates an amount of change $\Delta PA$ in air pressure from the air pressure PA detected in the previous execution as $\Delta PA = PA - PA_{i-1}$ and an amount of change $\Delta VAIR$ in air speed from the air speed VAIR detected in the previous execution as $\Delta VAIR = VAIR - VAIR_{i-1}$, where $PA_{i-1}$ and $VAIR_{i-1}$ are the air pressure and the air speed detected in the previous execution of the operation. The values $PA_{i-1}$ and $VAIR_{i-1}$ are updated in step 605 in every execution of the operation.

After calculating the values $\Delta PA$, $\Delta VAIR$, the EEC 30 determines in step 607 whether the supercharger has reached the intercept point, that is, whether the boost pressure PD has reached a set maximum pressure $PD_{MAX}$. If the determination in step 607 is affirmative, operation proceeds to step 609, in which the amount of change $\Delta PA$ of the air pressure PA from the value detected in the previous execution of the second control operation is smaller than a predetermined value $\Delta PA_2$ ($\Delta PA_2 > 0$). If the determination in step 609 is affirmative, it is determined in step 611 whether the amount of change エラー! ブックマークが定義されていません。 VAIR of the air speed VAIR from the value detected in the previous execution of the operation is smaller than a predetermined value $\Delta VAIR_2$ ($\Delta VAIR_2 > 0$). That is, in steps 609 and 611, it is determined whether the changes in flight altitude and flight speed are smaller than the predetermined values. In this embodiment, if the amount of change in flight altitude and the amount of change in flight speed continue to be smaller than the predetermined values for a predetermined length of time, it is determined that the steady flight condition has been established. If it is determined in any one of steps 607–611 that the condition is not met, operation proceeds to step 613, in which a time measuring counter CT is reset. If all the conditions in steps 607, 609, 611 are met, operation proceeds to step 619, in which the count of the time measuring counter CT is incremented by 1. When the count of the time measuring counter CT reaches a value $CT_2$ corresponding to the predetermined length of time, it is determined that the supercharger has reached the intercept point and the steady flight condition has been established. Subsequently in step 621, the set throttle valve opening THS is set to a value $THS_{MAX}$ corresponding to the full opening of the throttle valve 11. If it is determined in any one of steps 607, 609, 611 that the condition is not met, the time measuring counter CT is reset in step 613, and the throttle valve opening THS is set to the basic set value $THS_0$ set in the first control operation in step 615. While the count of the time measuring counter CT does not reach the value $CT_2$, the EEC 30 sets, in step 615, the throttle valve opening THS to the basic set value $THS_0$ set in the first control operation, without resetting the count of the time measuring counter CT in step 613.

After setting the throttle opening THS in step 615 or 621, the EEC 30 sets the set revolution speed GS of the propeller governor 31 to the basic set value $GS_0$ set in the first control operation and outputs the values GS, THS set as described above to the respective drive circuits in step 623.

Through this operation, it is possible to achieve high-efficiency operation of the engine 1 wherein the throttle valve 11 is held fully open to reduce the intake resistance while the engine revolution speed is kept at a value corresponding to the stroke of the power lever 12, in the steady flight condition after the supercharger has reached the intercept point.

That is, if the airplane is in the steady flight condition and the engine boost pressure has reached the set maximum value, the second control device sets and holds the throttle valve 11 fully open regardless of the setting made by the first control device. Therefore, the engine 1 enters a full load operation, and the intake resistance is reduced by the fully open throttle valve. Consequently, the fuel consumption in the steady flight condition is reduced, so that the flight range increases.

The second control operation according to the third embodiment of the invention will be described below.

In the third embodiment, if an abnormal increase in boost pressure (over-boost) or an abnormal increase in supercharger revolution speed (overrun) is caused by an abnormality in the WGV 26 or an abnormality in the supercharger control system, the opening of the throttle valve 11 of the engine 1 is set to a value that is less by a predetermined value than the basic set value $THS_0$ set in the first control operation. If the throttle valve opening is reduced, the amount of engine intake air decreases even though the engine revolution speed may remain unchanged. As a result, the engine exhaust gas flow correspondingly decreases, so that the supercharger revolution speed decreases. Therefore, by reducing the throttle valve opening, both the boost pressure and the supercharger revolution speed can be reduced.

Figure 7:
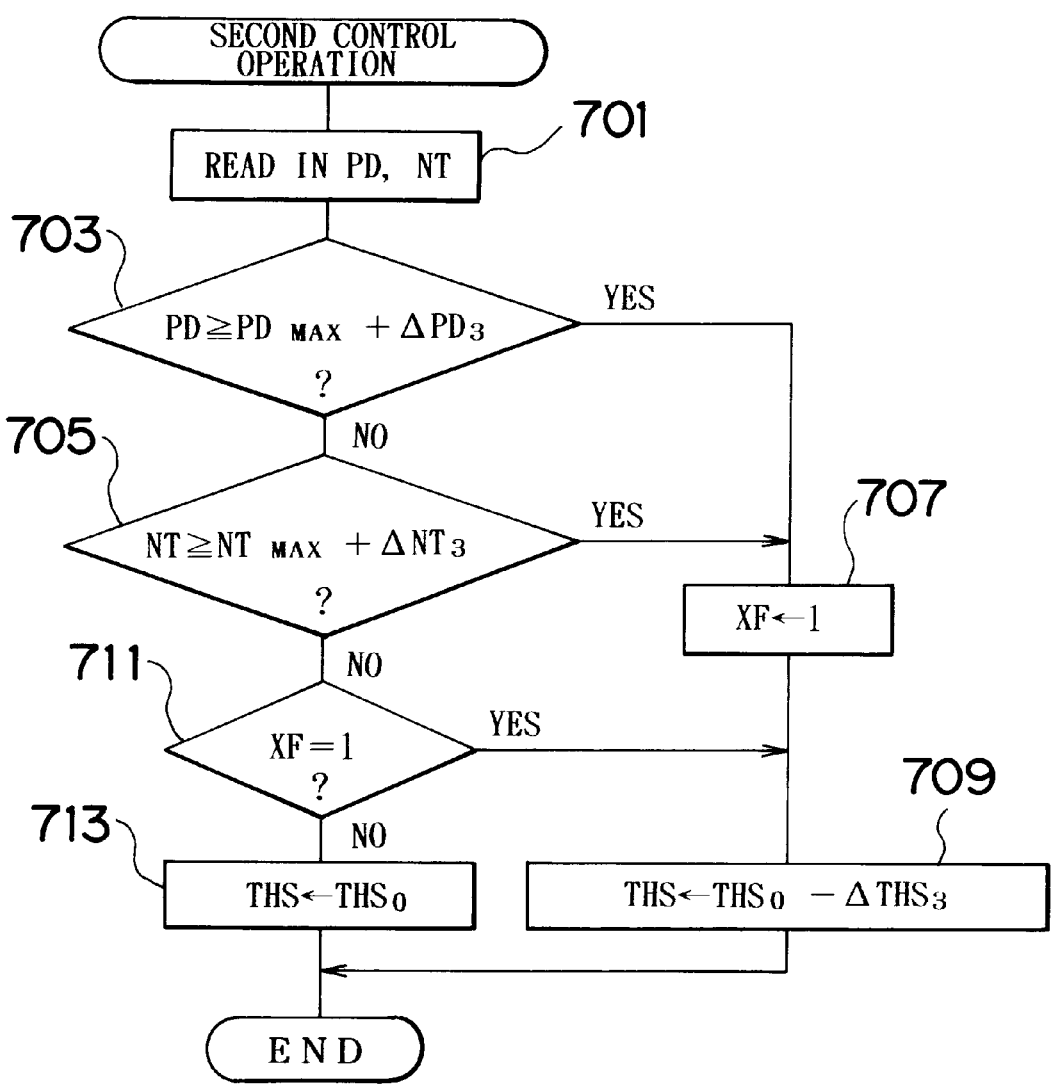
FIG. 7 is a flowchart illustrating the second control operation according to a third embodiment of the invention.

FIG. 7 is a flowchart illustrating the second control operation in the third embodiment. This operation is performed by a routine executed by the EEC 30 at constant time intervals.

In the operation illustrated in FIG. 7, the EEC 30 reads in the boost pressure PD and the turbocharger revolution speed NT from the sensors 34, 39. Subsequently in step 703, it is determined whether the boost pressure PD has exceeded the set maximum value $PD_{MAX}$ by a predetermined value $\Delta PD_3$, that is, whether over-boost is occurring. If the determination in step 703 is negative, operation proceeds to step 705, in which the EEC 30 determines whether the turbocharger revolution speed NT has exceeded the set maximum revolution speed $NT_{MAX}$ by a predetermined value $\Delta NT_3$, that is, whether overrun is occurring.

If the EEC 30 determines in step 703 or 705 that over-boost or overrun is occurring, operation proceeds to step 707, in which an abnormality flag XF is set to 1. Subsequently in step 709, the set opening THS of the throttle valve 11 is reduced by $\Delta THS_3$ from the basic set value $THS_0$. Therefore, the engine exhaust flow decreases, so that both the boost pressure PD and the turbocharger revolution speed NT decrease.

Conversely, if it is determined in steps 703 and 705 that neither over-boost nor overrun is occurring, operation proceeds to step 711, in which it is determined whether the present value of the abnormality flag XF is 1. If $XF \neq 1$, it is determined that no abnormality is occurring in the supercharger system. Subsequently in step 713, the opening THS of the throttle valve 11 is set to the basic set value $THS_0$ set in the first control operation. Conversely, if it is determined in step 711 that $XF=1$, it means that over-boost or overrun occurred and was controlled by the processing in step 709. If the throttle valve opening is set to the basic set value $THS_0$ in this condition, over-boost or overrun is likely to occur again. Therefore, in this case, a correction operation of reducing the throttle valve opening is performed in step 709. The aforementioned abnormality flag XF is set to 0 when the engine 1 is started. Once the abnormality flag XF is set to 1 in response to occurrence of an abnormality during engine operation, the flag state of $XF=1$ is maintained until the engine 1 is restarted after being stopped. Although not illustrated in the drawings, the set revolution speed GS of the propeller governor 31 is set to the basic set value $GS_0$ set in the first control operation in this embodiment. When a throttle valve opening is set in the operation illustrated in FIG. 7, the set values GS, THS are set in the drive circuits 69 by an operation performed separately by the EEC 30.

The second control operation according to the fourth embodiment of the invention will be described below.

Figure 8:
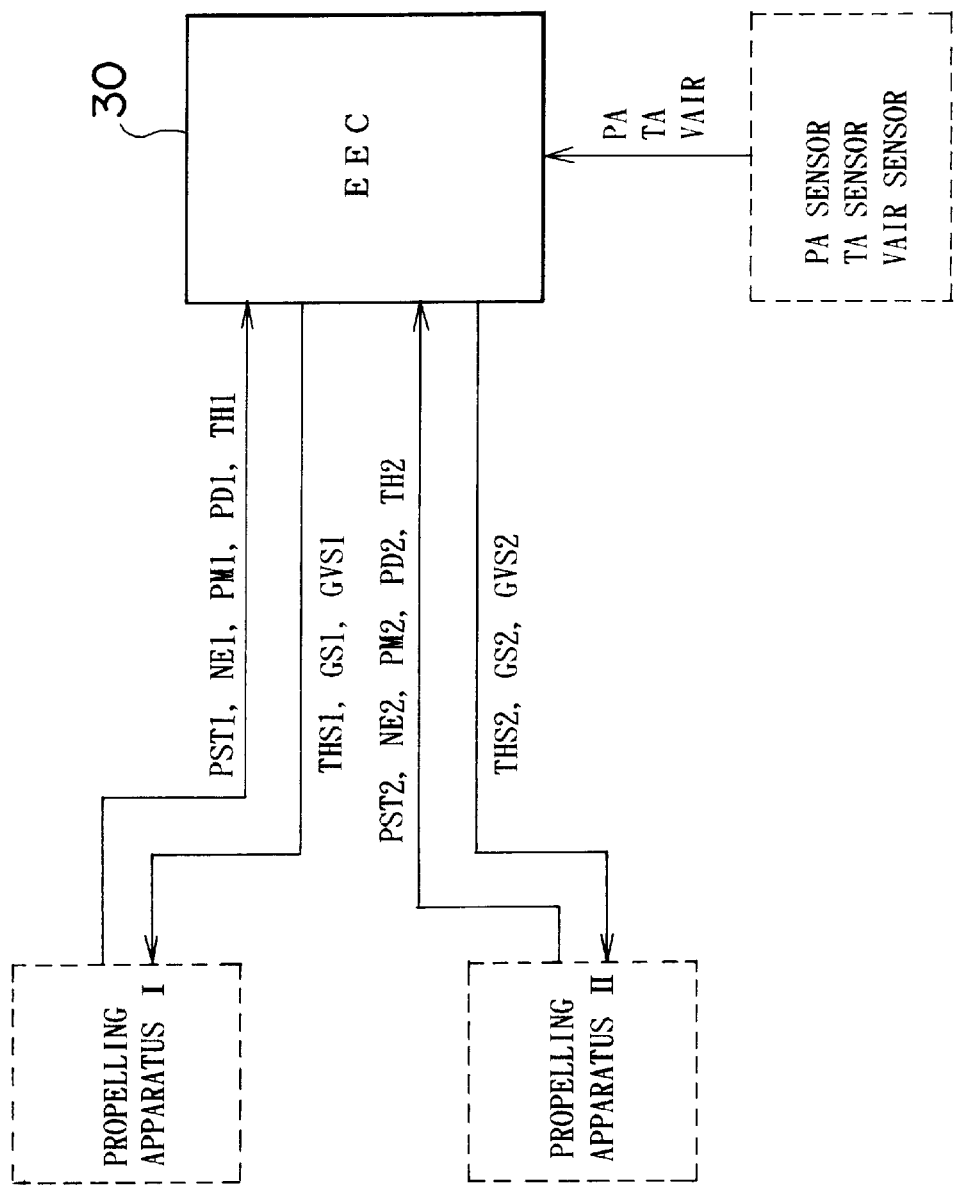
FIG. 8 is illustrates an example of the construction of a control unit in a fourth embodiment of the invention.

According to the fourth embodiment, the aircraft is, for example, a twin-engined aircraft having two engines and two propellers. As indicated in FIG. 8, the aircraft employs two propelling apparatuses each having all the components shown in FIG. 1, that is, the power lever 12, the engine 1, the propeller 2, the propeller governor 31, the throttle valve 11 and the like. Furthermore, an EEC 30 in this embodiment reads in operation parameters, such as PST, NE, PM, PD, TH and so on, from the two propelling apparatuses (propelling apparatus I and propelling apparatus II) separately, and outputs a set opening THS of the throttle valve 11, a set revolution speed GS of the propeller governor 31, and a set opening GVS of the WGV 26 to each propelling apparatus.

In this embodiment, the EEC 30 performs a control operation of synchronizing the propeller revolution speed and the propeller blade revolution phase of each propelling apparatus by finely adjusting the set governor revolution speed GS of each propelling apparatus.

In airplanes having a plurality of propellers, such as a twin-engined aircraft, non-uniformity in revolution speed or blade revolution phase among the propellers may increase the noise level due to interference among eddies along the slipstreams from the propellers. In this embodiment, the engine revolution speed and the crankshaft revolution phase (that is, the propeller revolution phase) of each propelling apparatus are detected by its NE sensor 32, and the set revolution speed of the propeller governor 31 of each propelling apparatus set in the first control operation is adjusted so that the engine revolution speeds and the crankshaft revolution phases become equal to each other. Through this operation, it becomes possible to reduce the noise level of the airplane having a plurality of engines and propellers, for example, a twin-engined aircraft, without needing to employ a special sensor or a control device.

Figure 9:
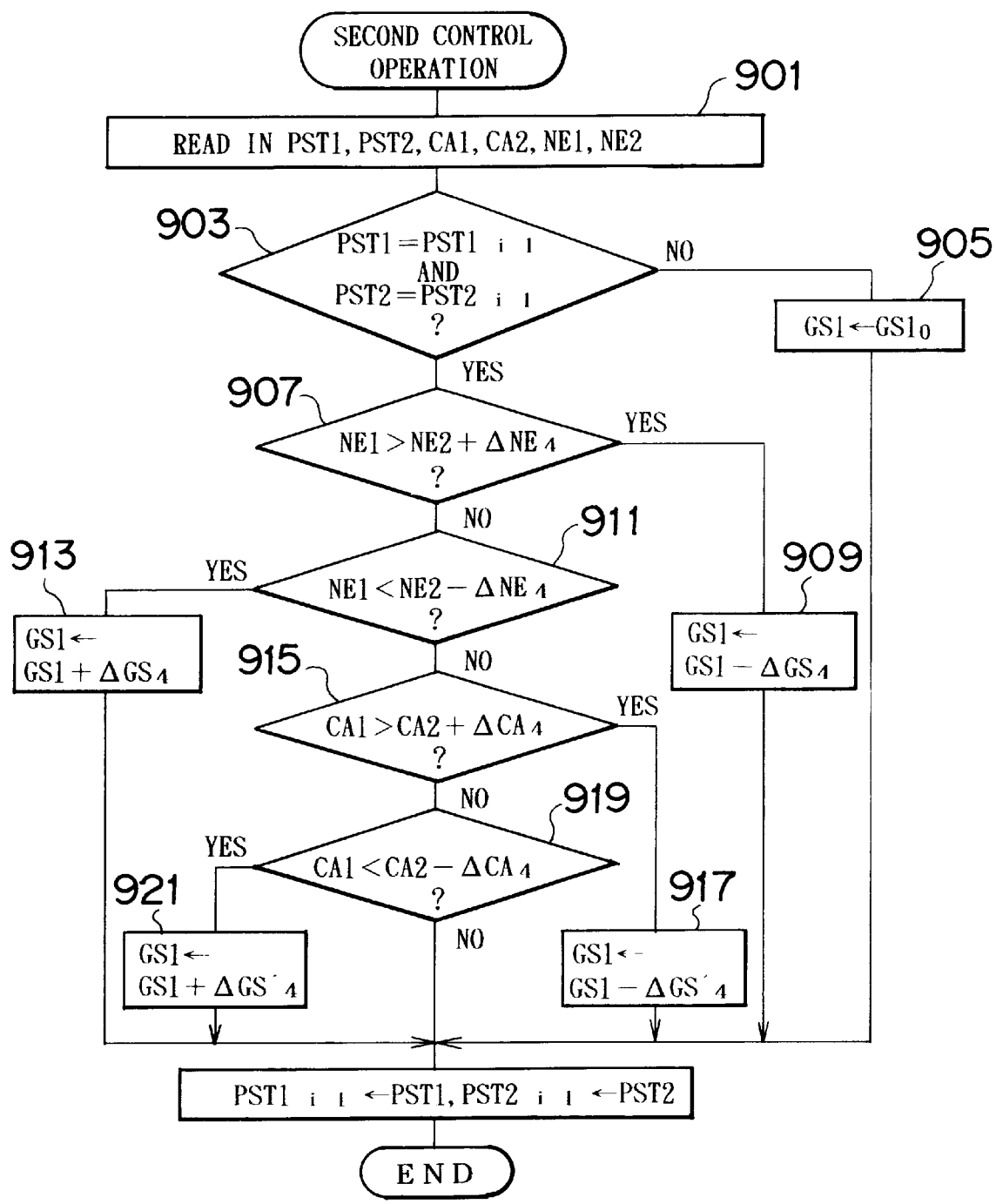
FIG. 9 is a flowchart illustrating the second control operation according to a fourth embodiment of the invention.

FIG. 9 is a flowchart illustrating the second control operation according to this embodiment. This control operation is performed by a routine executed by the EEC 30 at constant time intervals.

When the operation illustrated in FIG. 9 is started, the EEC 30 reads in the strokes PST1, PST2 of the power levers 12 of the propelling apparatuses I and II from their respective stroke sensors 12a, and further reads in the crankshaft resolution phases (crank angles) CA1, CA2 and the engine revolution speeds NE1, NE2 calculated on the basis of the rotational angle pulse signals and the reference position signals from the respective NE sensors 32.

Subsequently in step 903, it is determined whether the power levers 12 were operated after the previous execution of this operation, that is, whether the power lever strokes PST1, PST2 are equal to the strokes $PST1_{i-1}$, $PST2_{i-1}$ detected in the previous execution of the second control operation or either power lever stroke has changed therefrom. If one or both of the power lever strokes have changed ("NO" in step 903), operation proceeds to step 905, in which the set opening GS1 of the propeller governor 31 of the propelling apparatus I is set to the basic set value $GS1_0$ set in the first control operation without correcting the revolution speed and the revolution phase thereof. Subsequently in step 923, the values $PST1_{i-1}$, $PST2_{i-1}$ are updated. The present execution of the operation then ends. In this embodiment, the set revolution speed GS2 of the propeller governor 31 of the propelling apparatus II is always kept at the basic set value $GS2_0$ set in the first control operation, and the propelling apparatus I is synchronized to the propelling apparatus II by adjusting the revolution speed and the revolution phase of the propelling apparatus I as described below.

If it is determined in step 903 that the strokes of the two power levers 12 have remained unchanged from the previous values, that is, if it is considered that the engine revolution speed of each propelling apparatus has been controlled to a constant value, the revolution speed correction and the revolution phase correction are performed in steps 907 through 921.

The revolution speed correcting operation is performed in steps 907–913. In steps 907 and 911, the EEC 30 compares the revolution speed NE1 of the propelling apparatus I and the revolution speed NE2 of the propelling apparatus II to determine whether the revolution speed NE1 differs from the revolution speed NE2 by a predetermined value $\Delta NE_4$ or greater, that is, whether the revolution speed NE1 is out of the range of $NE2-\Delta NE_4 \leq NE1 \leq NE2-\Delta NE_4$. If the revolution speed NE1 is greater than the revolution speed NE2 by at least the $\Delta NE_4$ ("YES" in step 907), the set value GS1 of the propeller governor 31 of the propelling apparatus I is reduced by $\Delta GS_4$ in step 909. If the revolution speed NE1 is less than the revolution speed NE2 by at least the $\Delta NE_4$ ("YES" in step 911), the set value GS1 of the propeller governor 31 of the propelling apparatus I is increased by $\Delta GS_4$ in step 913. The adjustment of the revolution speed NE1 of the propelling apparatus I in this manner is performed repeatedly at every execution of the second control operation until the revolution speed NE1 comes into the range of $NE2 \pm \Delta NE_4$. The value $\Delta NE_4$ has such a magnitude that if NE1 is within the range of $NE2 \pm \Delta NE_4$, it can be determined that NE1 is substantially equal to NE2.

When the revolution speed of the propelling apparatus I becomes equal to that of the propelling apparatus II, the revolution phases of the two propelling apparatuses are then synchronized in steps 915 through 921. In steps 915 and 919, the EEC 30 compares the crank angle CA1 of the propelling apparatus I and the crank angle CA2 of the propelling apparatus II to determine whether the crank angle CA1 differs from the crank angle CA2 by a predetermined value $\Delta CA_4$ or greater. If the crank angle CA1 of the propelling apparatus I is greater than the crank angle CA2 of the propelling apparatus II by at least the predetermined value $\Delta CA_4$ ("YES" in step 915), the set value GS1 of the propeller governor 31 of the propelling apparatus I is reduced by a predetermined value $\Delta GS_4'$ in step 917. If the crank angle CA1 is less than the crank angle CA2 by at least the predetermined value $\Delta CA_4$ ("YES" in step 919), the set value GS1 of the propeller governor 31 of the propelling apparatus I is increased by the value $\Delta GS_4'$ in step 921. The adjustment of the set value GS1 of the propeller governor 31 of the propelling apparatus I is performed repeatedly at every execution of the operation until the crank angle CA1 comes into the range of $CA2 \pm \Delta CA_4$. Thus, the revolution phase of the propelling apparatus I is adjusted until the crank angle CA1 of the propelling apparatus I comes into the range where the crank angle CA1 can be considered substantially synchronous with the crank angle CA2 of the propelling apparatus II (that is, $CA2-\Delta CA_4 \leq CA1 \leq CA2+\Delta CA_4$). Should the revolution phase adjustment performed in steps 915–921 causes the revolution speed NE1 to become different from the revolution speed NE2 beyond the aforementioned range, the revolution speed adjustment is performed again in steps 907–913, so that the two propelling apparatuses eventually become synchronized in both revolution speed and revolution phase. Through the operation described above, this embodiment can reduce the noise level of an airplane having a plurality of propelling apparatuses, such as a twin-engined aircraft.

The second control operation according to the fifth embodiment of the invention will be described below.

The fifth embodiment performs control such that when the airplane is in the steady flight condition, the total efficiency $\eta_T$ of the propelling apparatus, that is, an integration of the efficiencies $\eta_P$, $\eta_E$, $\eta_{TC}$ of the propeller 2, the engine 1 and the turbocharger 10, becomes maximized, by adjusting the pitch of the propeller 2 through the use of the propeller governor 31, and adjusting the engine intake pressure PM through the use of the throttle valve 11, and controlling the turbocharger revolution speed NT through control of the opening of the WGV 26.

In this embodiment, an optimal attack angle $\alpha_0$ of the propeller blades is calculated from the present propeller revolution speed NE, the present air density $\rho$ and the air speed VAIR. The propeller pitch $\beta$ is adjusted by the propeller governor 31 so as to achieve the calculated optimal attack angle $\alpha_0$. Subsequently, an intake pressure $PM_0$ that maximizes the engine efficiency is calculated from the engine revolution speed NE occurring after the propeller pitch adjustment. The throttle valve opening THS is adjusted so as to achieve the calculated intake pressure $PM_0$. After the throttle valve opening adjustment, a turbocharger revolution speed NT that maximizes the turbocharger compressor efficiency is calculated from the compression ratio and the intake flow of the turbocharger 10. The opening GVS of the WGV 26 is adjusted so as to achieve the calculated turbocharger revolution speed NT. After the adjustment, the EEC 30 reads in the engine operation parameters again, and calculates the efficiencies $\eta_P$, $\eta_E$, $\eta_{TC}$ of the propeller 2, the engine 1 and the turbocharger 10 from the parameters, and calculates the total efficiency $\eta_T$. Subsequently, the EEC 30 determines whether the calculated total efficiency $\eta_T$ equals the maximum value. If the total efficiency $\eta_T$ is not equal to the maximum value, the optimization of the propeller pitch, the throttle valve opening and the WGV opening is repeated. Eventually, the propeller pitch, the throttle valve opening and the WGV opening are adjusted so that the total efficiency $\eta_T$ is maximized.

Figure 10:
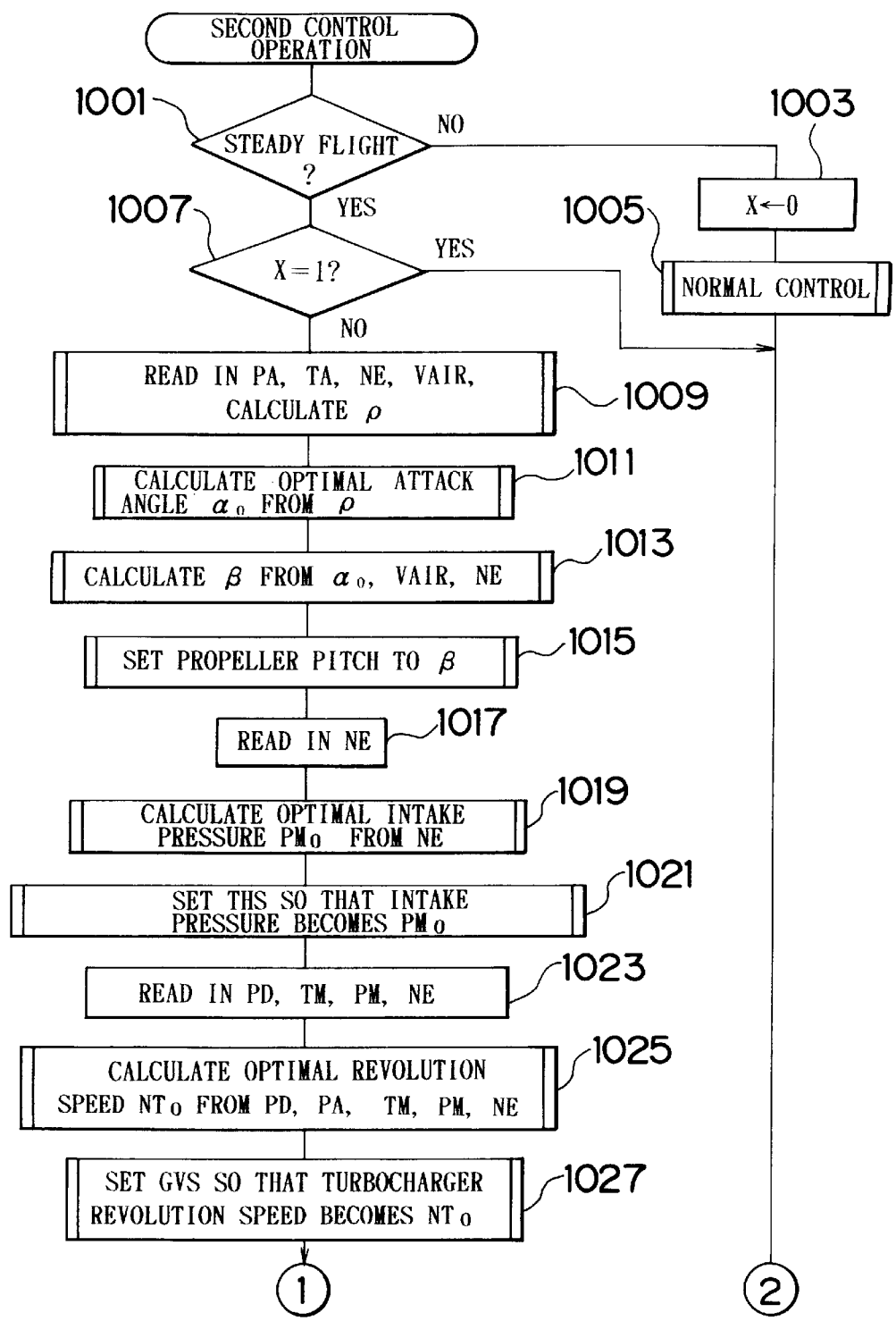
FIGS. 10 and 11 show a flowchart illustrating the second control operation according to a fifth embodiment of the invention.
Figure 11:
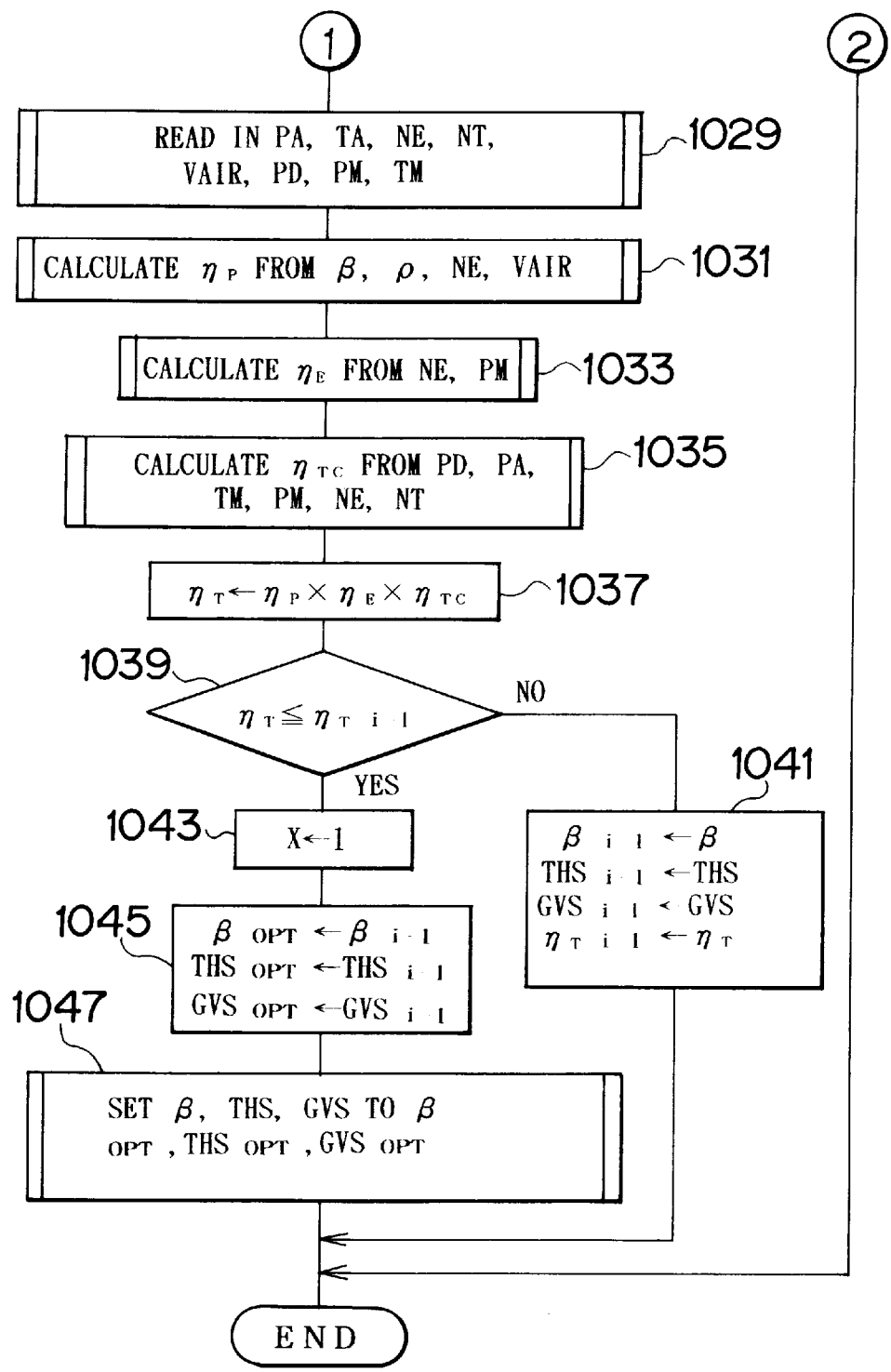

FIGS. 10 and 11 show a flowchart illustrating the second control operation of this embodiment. This operation is performed by a routine executed by the EEC 30 at constant time intervals.

When the operation illustrated in FIG. 10 is started, the EEC 30 determines in step 1001 whether the aircraft is presently in the steady flight condition. If the change in the stroke of the power lever 12, the change in the flying altitude of the airplane and the change in the air speed remain small for a predetermined length of time, it is determined in step 1001 that the airplane is in the steady flight condition.

If it is determined in step 1001 that the airplane is not in the steady condition, operation proceeds to step 1003, in which an optimization end flag X described below is set to 0. Subsequently in step 1005, normal thrust control is performed. In the normal thrust control in step 1005, the set revolution speed GS of the propeller governor 31 and the opening THS of the throttle valve 11 are set to the basic set values $GS_0$, $THS_0$, respectively, which are set in the first control operation. Moreover, in the normal thrust control, the opening GVS of the WGV 26 is controlled so that the boost pressure PD is kept at a set maximum pressure.

Conversely, if the EEC 30 determines in step 1001 that the steady flight is being conducted, operation proceeds to step 1007, in which the EEC 30 determines whether the optimization has been completed, on the basis of the value of the optimization end flag X. The optimization end flag X is set to 1 in step 1043 in FIG. 11 if the optimization of the total efficiency $\eta_T$ of the propelling apparatus has been completed. That is, X=1 indicates that the optimization has been completed. If it is determined in step 1007 that the optimization has been completed, the present execution of the second control operation immediately ends, so that the present operating condition (that is, the operating condition after the optimization) is maintained. In this case, the optimizing operation in step 1009 and the following steps is not performed until the steady flight condition discontinues so that the optimization end flag X is set to 0 in step 1003.

If the EEC 30 determines in step 1007 that the optimization has not been completed (X≠1), operation proceeds to step 1009, in which the EEC 30 reads in the air pressure PA, the air temperature TA, the engine (propeller) revolution speed NE and the air speed VAIR from the corresponding sensors, and calculates the air density $\rho$ from PA and TA. Subsequently in step 1011, the EEC 30 calculates an optimal value $\alpha_0$ of the propeller blade attack angle based on the air density $\rho$. Based on the optimal attack angle $\alpha_0$, the engine revolution speed NE and the air speed VAIR, the EEC 30 calculates an optimal propeller pitch $\beta$ for achieving the optimal attack angle $\alpha_0$. After the optimal value $\beta$ of propeller pitch is calculated, the EEC 30 adjusts the propeller governor 31 so that the propeller pitch reaches the optimal value $\beta$, in step 1015. The propeller pitch is thus adjusted to the optimal value $\beta$.

In steps 1017 through 1021, the optimization of the engine 1 is performed. In step 1017, the EEC 30 reads in the present engine revolution speed NE again. This is because the propeller pitch adjustment in step 1015 likely to change the engine operation condition from that occurring at the time of execution of step 1009 and also change the revolution speed NE. In step 1019, the EEC 30 calculates an intake pressure $PM_0$ that maximizes the engine efficiency, on the basis of the engine revolution speed NE detected in step 1017. Subsequently in step 1021, the throttle valve opening THS is adjusted so that the intake pressure reaches the optimal value $PM_0$.

In steps 1023–1027, the operating condition of the turbocharger 10 is optimized. In step 1023, the EEC 30 reads in the present boost pressure PD, the present intake pressure PM, the present intake temperature TM and the present engine revolution speed NE. The intake temperature TM is detected by an intake temperature sensor (not shown) disposed in the intake duct downstream of the intercooler 8. The reason why the EEC 30 reads PM and NE again in step 1023 is the same as stated above in conjunction with the operation in step 1017. Subsequently in step 1025, based on the present turbocharger compression ratio PR (PR=PD/TA) and the intake flow (compression ejection flow) Q determined by PM, NE and TM, the EEC 30 calculates an optimal turbocharger revolution speed $NT_0$ that achieves a maximum compressor efficiency $\eta_{TC}$ under the present conditions of the compression ratio PT and the flow Q. Subsequently in step 1027, the opening of the WGV 26 is controlled so that the actual turbocharger revolution speed becomes equal to the optimal turbocharger revolution speed $NT_0$ calculated in step 1025.

After individually optimizing the propeller pitch, the engine intake pressure PM and the turbocharger revolution speed NT in steps 1009 through 1027, the EEC 30 calculates a present total efficiency $\eta_T$ in steps 1029 through 1037 in FIG. 11.

In step 1029, the EEC 30 reads in the operating condition parameters PA, TA, NE, NT, VAIR, PD, PM, TM again. Subsequently in step 1031, a present propeller efficiency $\eta_P$ is calculated from the propeller pitch $\beta$ set in step 1015, the air density $\rho$, and the revolution speed NE and the air speed VAIR. The present propeller efficiency $\eta_P$ theoretically equals the maximum efficiency obtained when the optimal attack angle $\alpha_0$ was determined in step 1011, if the aforementioned operating condition parameters have not changed at all from the values of the parameters detected in step 1009. In reality, however, the operating condition parameters change from the values detected in step 1009 due to the adjustment of the propeller pitch $\beta$ in step 1015, the adjustment of the throttle valve opening THS in step 1021, and the adjustment of the opening GVS of the WGV 26 in step 1027. As a result, the present propeller efficiency $\eta_P$ with the propeller pitch $\beta$ does not necessarily equal the aforementioned maximum efficiency. Therefore, in step 1031, the EEC 30 re-calculates the propeller efficiency $\eta_P$ under the present conditions.

Likewise, the EEC 30 calculates the present engine efficiency $\eta_E$ on the basis of the present engine revolution speed NE and the present intake pressure PM in step 1033. Subsequently in step 1035, the EEC 30 calculates the turbocharger compressor efficiency $\eta_{TC}$ under the present operating conditions on the basis of the present compression ratio PR, the present intake flow Q and the present turbocharger revolution speed NT.

Subsequently in step 1037, using the efficiencies $\eta_P$, $\eta_E$, $\eta_{TC}$, the EEC 30 calculates the present total efficiency $\eta_T$ of the propelling apparatus as $\eta_T = \eta_P \times \eta_E \times \eta_{TC}$.

In steps 1039 and 1041, it is determined whether the present total efficiency is a maximum value. In step 1039, the EEC 30 determines whether the total efficiency $\eta_T$ presently calculated has decreased from the total efficiency $\eta_{Ti-1}$ calculated after the previous optimizing operation. If $\eta_T > \eta_{Ti-1}$ ("NO" in step 1037), that is, if the total efficiency $\eta_T$ has increased from the previous value through the optimizing operation in step 1009–1027 during the present execution, there is the possibility that the total efficiency $\eta_T$ can still be improved through the optimizing operation. Therefore, in step 1041, the present propeller pitch β, the present throttle valve opening THS, the present WGV opening GVS and the present total efficiency $\eta_T$ are stored as $\beta_{i-1}$, $THS_{i-1}$, $GVS_{i-1}$ and $\eta_{Ti-1}$. Then the present execution of the second control operation ends. As is apparent from the above description, if it is determined in step 1039 that the total efficiency $\eta_T$ has increased from the previous value, the optimizing operation in step 1009 through 1027 is performed again during the next execution of the second control operation.

Conversely, if it is determined in step 1039 that $\eta_T \leq \eta_{Ti-1}$, it means that the total efficiency $\eta_T$, improved through repeated optimizing operations, now has decreased through the present optimizing operation, that is, the previous efficiency $\eta_{Ti-1}$ was a maximum value of the total efficiency. Therefore, in this case, the optimization end flag X is set to 1 in step 1043, so as to prevent further execution of the optimizing operation in steps 1009 through 1027. Subsequently in step 1045, the propeller pitch $\beta_{i-1}$, the throttle valve opening $THS_{i-1}$ and the WGV opening $GSV_{i-1}$ stored in the previous operation of the second control operation stored as optimal values $\beta_{OPT}$, $THS_{OPT}$, $GVS_{OPT}$. In step 1047, the propeller pitch β, the throttle valve opening THS and the WGV opening GVS are set to the respective optimal values $\beta_{OPT}$, $THS_{OPT}$, $GVS_{OPT}$. Then the present execution of the second control operation ends. Thus, in this operation, the propeller pitch, throttle valve opening and the WGV opening are set to the values corresponding to a maximum total efficiency occurring in the previous execution of the operation, so that the total efficiency of the propelling apparatus is fixed to the maximum value.

In short, the second control device according to this embodiment corrects the engine revolution speed and the throttle valve opening and the waste gate valve (WGV) opening in accordance with the flight conditions, and therefore corrects the propeller efficiency, the engine efficiency and the turbocharger efficiency so that the efficiencies are maximized in a given flight condition. Therefore, the fuel consumption of the airplane can be improved, and the flight range can be increased.

The second control operation according to the sixth embodiment of the invention will be described below.

In the sixth embodiment, the EEC 30 performs control such that the revolution speed of the turbocharger 10 is kept high, in flight conditions that there is a possibility of output of a sharp output increase request, for example, during a landing operation and the like. If the sharp output increase is outputted, the EEC 30 performs control such that the engine is kept in a state where the engine output (thrust) can be increased in a short time. For example, during the landing operation, a so-called go-around operation of stopping the landing operation and causing a sharp ascent of the airplane body may be requested. A sharp ascent of the airplane body or the like may also be required during cruising flight or the like, depending on whether condition or the like. However, the sharp output increase request cannot be met in some cases. For example, in a case where the engine output has decreased, particularly, during a descent or the like, the turbocharger revolution speed has also decreased, so that it requires a long time to increase the turbocharger revolution speed after the output of the sharp output increase request. Therefore, this embodiment sets the opening of the WGV 26 to a value that is smaller than the value used in normal control so as to prevent a significant reduction in the turbocharger revolution speed, during the landing operation, or when the operator selects so even if the landing operation is not being performed. In this case, if the turbocharger revolution speed is kept high, the correspondingly high boost pressure increases the engine output, so that a sufficient descending rate for landing or the like cannot be achieved in some cases. Therefore, in this embodiment, the throttle valve opening is set to a value less than the set value set in the first control operation, so as to prevent an increase in the engine intake pressure. Through this operation, this embodiment is able to keep the turbocharger revolution speed high without causing an increase in the engine output, and therefore prepare for a sharp engine output increase request.

Figure 12:
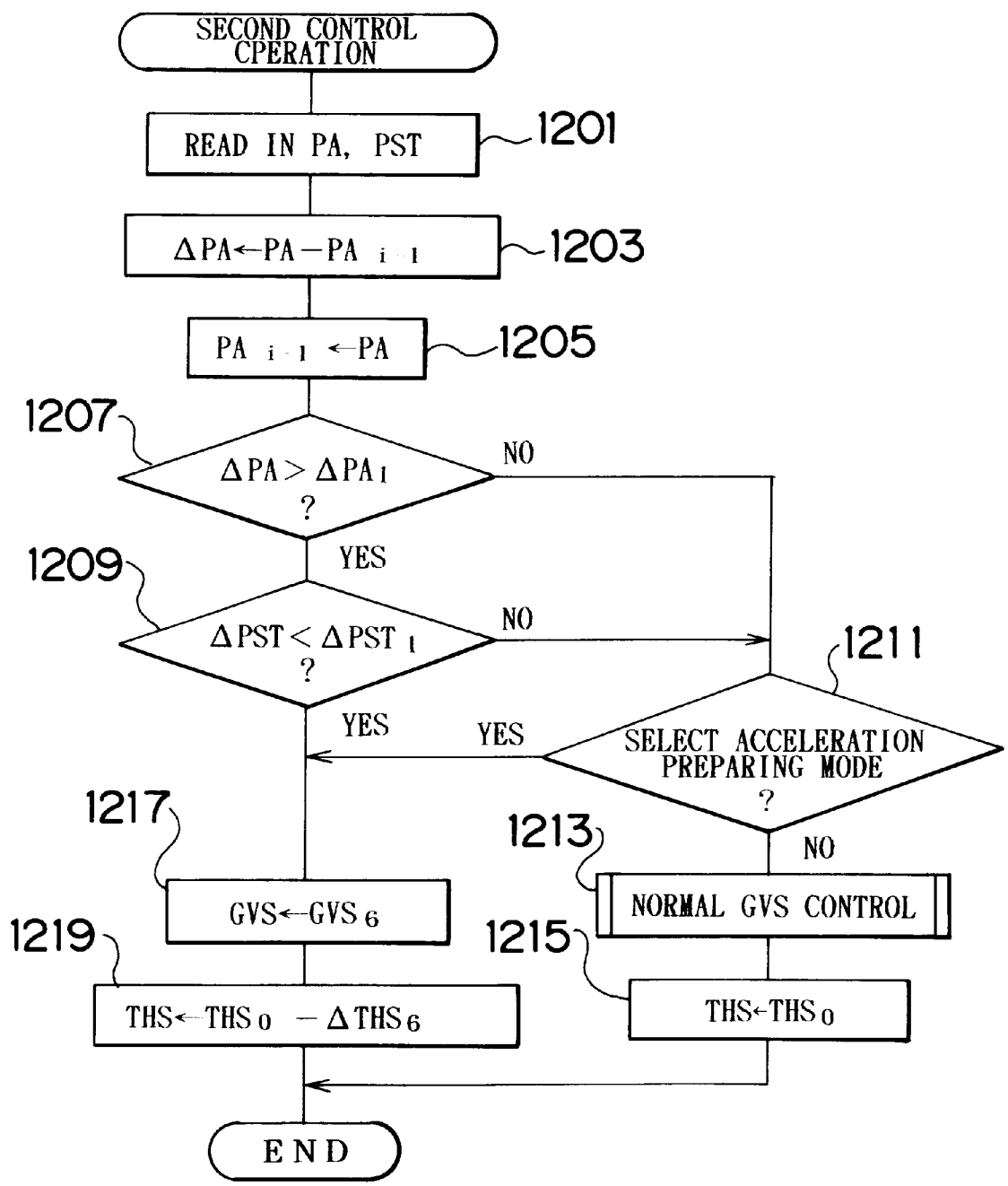
FIG. 12 is a flowchart illustrating the second control operation according to a sixth embodiment of the invention.

FIG. 12 is a flowchart illustrating the second control of this embodiment. This control operation is performed by a routine executed by the EEC 30 at constant time intervals.

When the operation illustrated in FIG. 12 is started, the EEC 30 determines in steps 1201 through 1209 whether the landing (descending) operation is being performed. In this embodiment, this determining operation is performed in the same manner as in the first embodiment (FIG. 5), that is, the operation performed in steps 1201 through 1209 in FIG. 12 is the same as that performed in steps 501 through 509 in FIG. 5.

This embodiment differs from the first embodiment in that if it is determined in step 1207 or 1209 that the descending operation is not being performed, the EEC 30 then determines in step 1211 whether the pilot has selected an acceleration preparation mode. In the sixth embodiment, an acceleration preparation mode select switch is provided in a cockpit of the airplane body, so that even when the descending operation is not being performed, the pilot can selectively instruct the EEC 30 to enter the acceleration preparation mode, in which preparations for the output of the sharp output increase request are made. If it is determined in step 1211 that the acceleration preparation mode is not selected, operation proceeds to step 1213, in which the normal control of the opening of the WGV 26 is performed. In the normal opening control, the WGV opening GVS is controlled so that a predetermined value (for example, a set maximum pressure $PD_{MAX}$) of the boost pressure PD is maintained. If the boost pressure PD is lower than the maximum pressure $PD_{MAX}$, the WGV 26 is completely closed.

Subsequently to the GVS normal control performed if the acceleration preparation mode is not selected, the EEC 30 controls, in step 1215, the opening of the throttle valve 11 to the basic set value $THS_0$ set in the first control operation.

Conversely, if it is determined in steps 1207 and 1209 that the descending operation is being performed, or if it is determined in step 1211 that the acceleration preparation mode has been selected, operation proceeds to step 1217, in which the EEC 30 sets the WGV opening GVS to a predetermined opening $GVS_6$ that is smaller than the opening set in the normal control. Therefore, the turbocharger revolution speed is kept higher than the value set by the normal control. Subsequently in step 1219, the EEC 30 sets the throttle valve opening THS to an opening that is smaller, by a predetermined amount $\Delta THS_6$, than the basic set value $THS_0$ set in the first control operation. Therefore, in operating conditions where the sharp output request is expected to be outputted, this embodiment keeps the turbocharger revolution speed high without increasing the engine output. If the sharp output request is outputted, the embodiment immediately increases the boost pressure. Thus, the engine output can be increased in a short time when necessary.

In short, in this embodiment, the second control device is able to enter a control mode that is suitable for cases where the output of the sharp output increase is expected. During this control mode, the second control device sets the waste gate valve (WGV) opening to a small value, and keeps the turbocharger revolution speed high, but sets the throttle valve opening to a small value in order to prevent or reduce the engine output increase caused by the increased boost pressure. Therefore, even in a flight condition that the engine output (thrust) is low, the turbocharger revolution speed does not decrease. Consequently, if the sharp output increase request is outputted during a low engine output (thrust) state, the turbocharger revolution speed in response to the request can be achieved in a reduced amount of time, so that the engine output can be increased in a reduced amount of time.

According to the embodiments of the invention described above, it becomes possible to control the engine to an appropriate operating condition that is suitable to a given flight condition without increasing the workload on the pilot.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A thrust control apparatus for controlling the thrust generated by an airplane internal combustion engine and a variable pitch propeller driven by said internal combustion engine, wherein the engine includes a throttle valve, the thrust control apparatus comprising:

a variable pitch controller coupled to the variable pitch propeller for controlling an engine speed by changing a pitch of the propeller;

a throttle controller coupled to the throttle valve, wherein the throttle controller controls a degree of opening of the throttle valve;

a control lever operated by an operator of the airplane;

means for determining a flight condition of the airplane; and control means coupled to the control lever, the variable pitch controller, the throttle controller and the flight condition determining means, wherein the control means sets an initial engine speed and an initial degree of opening of the throttle valve based on a degree of operation of the control lever and wherein the control means sets a corrected engine speed based on the initial engine speed and the flight condition and sets a corrected degree of opening of the throttle valve based on the initial degree of opening of the throttle valve and the flight condition.

2. A thrust control apparatus according to claim 1, wherein the flight condition determining means determines whether a descending operation of the airplane is being performed and wherein, when the airplane is descending, the control means sets the corrected degree of opening of the throttle valve to a value smaller than the initial degree of opening of the throttle and sets the corrected engine speed to a value different from the initial engine speed.

3. A thrust control apparatus according to claim 1, wherein the flight condition determining means detects whether an engine boost pressure has reached an intercept point and detects whether the airplane is in a steady flight state, and wherein, when the boost pressure has reached the intercept point and the airplane has entered the steady flight state, the control means sets the corrected degree of opening of the throttle valve to a maximum degree of opening.

4. A thrust control apparatus according to claim 1, wherein the engine has a supercharger.

5. A thrust control apparatus according to claim 4, further comprising:

a waste gate valve for adjusting an engine exhaust flow moving through the supercharger; and a waste gate valve adjuster that controls an opening of the waste gate valve, wherein the flight condition determining means detects an atmosphere air condition and an air speed of the airplane, and wherein the control means is coupled to the waste valve adjuster and sets the opening of the waste valve adjuster, the corrected engine speed and the corrected degree of opening of the throttle valve so as to maximize a supercharger efficiency, a propeller efficiency, and an engine efficiency, respectively.

6. A thrust control apparatus according to claim 4, further comprising:

a waste gate valve for adjusting an engine exhaust flow moving through the supercharger;

a waste gate valve adjuster that controls an opening of the waste gate valve; and means for opening the waste gate valve to a set opening so that at least one of an ejection air pressure of the supercharger and a compression ratio of the supercharger reaches a predetermined value, wherein the control means corrects the set opening of the waste gate valve to a value at least as small as the set opening thereof set by the setting means, and sets the corrected degree of opening of the throttle valve to a value smaller than the initial degree of opening of the throttle valve.

7. A thrust control apparatus for controlling the thrust generated by a plurality of airplane internal combustion engines, each engine driving a corresponding variable pitch propeller and wherein each engine includes a throttle valve, the thrust control apparatus comprising:

means for controlling a speed of each engine by changing a pitch of the corresponding propeller;

means for controlling a degree of opening of each throttle valve;

a control lever operated by an operator of the airplane;

means for determining a flight condition of the airplane, wherein the flight condition determining means detects a revolution phase of a blade of each propeller; and control means coupled to the speed controlling means, the throttle controlling means, the control lever and the flight condition determining means, wherein, based on a degree of operation of the control lever, the control means sets for each engine an engine speed and an initial degree of throttle valve opening and wherein, based on the flight condition determined by the flight condition determining means, the control means sets for each engine a corrected engine speed and a corrected degree of throttle valve, wherein the control means sets the corrected engine speed for each engine so as to synchronize the revolution phase of the blades of the propellers.

8. An airplane thrust control method comprising the steps of:
controlling a speed of an internal combustion engine installed in an airplane by changing a pitch of a propeller driven by the engine;
controlling a degree of opening of a throttle valve of the engine;
operation, by an operator of the airplane, of a control lever to indicate a desired thrust;
setting initial values of the engine speed and the degree of opening of the throttle valve based on the operation of the control lever;
determining a flight condition of the airplane; and
setting a corrected engine speed on the basis of the initial engine speed and the flight condition and a corrected degree of opening of the throttle valve on the basis of the initial degree of opening of the throttle valve and the flight condition.

9. An airplane thrust control method according to claim 8, wherein in determining the flight condition of the airplane, it is detected whether a descending operation of the airplane is being performed by the operator, and
wherein when the descending operation is being performed, the corrected degree of opening of the throttle valve is smaller than the initial degree of opening and the corrected engine speed is different from the initial engine speed.

10. An airplane thrust control method according to claim 8, wherein in determining the flight condition, it is detected whether an engine boost pressure has reached an intercept point and whether the airplane is in a steady flight state, and wherein, when the boost pressure has reached the intercept point and the airplane has entered the steady flight state, the corrected degree of opening of the throttle valve is a maximum opening.

11. An airplane thrust control method according to claim 8, wherein the internal combustion engine has a supercharger.

12. An airplane thrust control method according to claim 11, wherein the engine includes a waste gate valve for adjusting an engine exhaust flow moving through the supercharger, the method further comprising the step of:
controlling an opening of the waste gate valve to a set opening, wherein in determining the flight condition, a condition of an atmospheric air and an air speed of the airplane are detected, and wherein the set opening of the waste valve, the initial engine speed set and the initial degree of opening of the throttle valve are set so as to maximize a supercharger efficiency, a propeller efficiency, and an engine efficiency, respectively.

13. An airplane thrust control method according to claim 11, wherein the engine includes a waste gate valve for adjusting an engine exhaust flow moving through the supercharger, the method further comprising the steps of:
controlling an opening of the waste gate valve to an initial set opening, wherein in determining the flight condition so that at least one of an ejection air pressure of the supercharger and a compression ratio of the supercharger reaches a predetermined value; and
correcting the set opening of the waste gate valve to a corrected set opening that is at least as small as the initial set opening, wherein corrected degree of opening of the throttle valve is smaller than the initial degree of opening thereof.

* * * * *